United States Patent
Yamaguchi et al.

(10) Patent No.: US 6,570,671 B1
(45) Date of Patent: May 27, 2003

(54) IMAGE FORMING APPARATUS AND RECORDING CONTROL DEVICE

(75) Inventors: Jun Yamaguchi, Numazu (JP); Toshihiko Otsubo, Numazu (JP); Michio Kawase, Mishima (JP); Kazuyoshi Suzuki, Numazu (JP); Takahiro Watanabe, Shizuoka-ken (JP); Tetsuro Fukusaka, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/406,691

(22) Filed: Sep. 27, 1999

(30) Foreign Application Priority Data

Sep. 28, 1998 (JP) .......................... 10-274050
Oct. 16, 1998 (JP) .......................... 10-295597

(51) Int. Cl.$^7$ .............................................. G06F 13/00
(52) U.S. Cl. ......................... 358/1.16; 358/1.1; 358/1.5
(58) Field of Search ........................... 358/1.1, 1.5, 1.8, 358/1.9, 1.11, 1.12, 1.13, 1.16, 1.17; 347/35, 55, 102, 188

(56) References Cited

U.S. PATENT DOCUMENTS

| 4,814,789 A | * | 3/1989 | Ono ........................... 347/188 |
| 5,923,820 A | * | 7/1999 | Cunnagin .................. 358/1.8 |
| 6,174,048 B1 | * | 1/2001 | Bern ........................... 347/55 |
| 6,185,003 B1 | * | 2/2001 | Oyen ......................... 358/1.9 |

* cited by examiner

Primary Examiner—Mark Wallerson
(74) Attorney, Agent, or Firm—Fitzpatrick, Cella, Harper & Scinto

(57) ABSTRACT

An image forming apparatus has a recording element array including plural recording elements, an image forming section for causing a relative movement between the recording element array and a recording medium, thereby to form an image, and a drive section for driving the recording element array based on image data. A duty control unit varies the recording duty of the recording elements according to the relative movement speed between the recording element array and the recording medium. In another version, an image forming apparatus has a recording element array including plural recording elements, an image forming unit that effects a relative movement between the recording element array and a recording medium, memory for storing image data, a drive unit for driving the recording element array based on the image data read from the memory and an inhibitor for selectively inhibiting the recording operation by the image read from the memory, according to the relative movement speed between the recording element array and the recording medium. In yet another version, an image forming apparatus has a recording element array including plural recording elements, an image forming unit for causing a relative movement between the recording element array and a recording medium, a smoothing unit for applying a smoothing process to the image data, according to the relative movement speed between the recording element array and the recording medium and drive means for driving the recording element array, based on the image data subjected to the smoothing process by the smoothing unit.

36 Claims, 21 Drawing Sheets

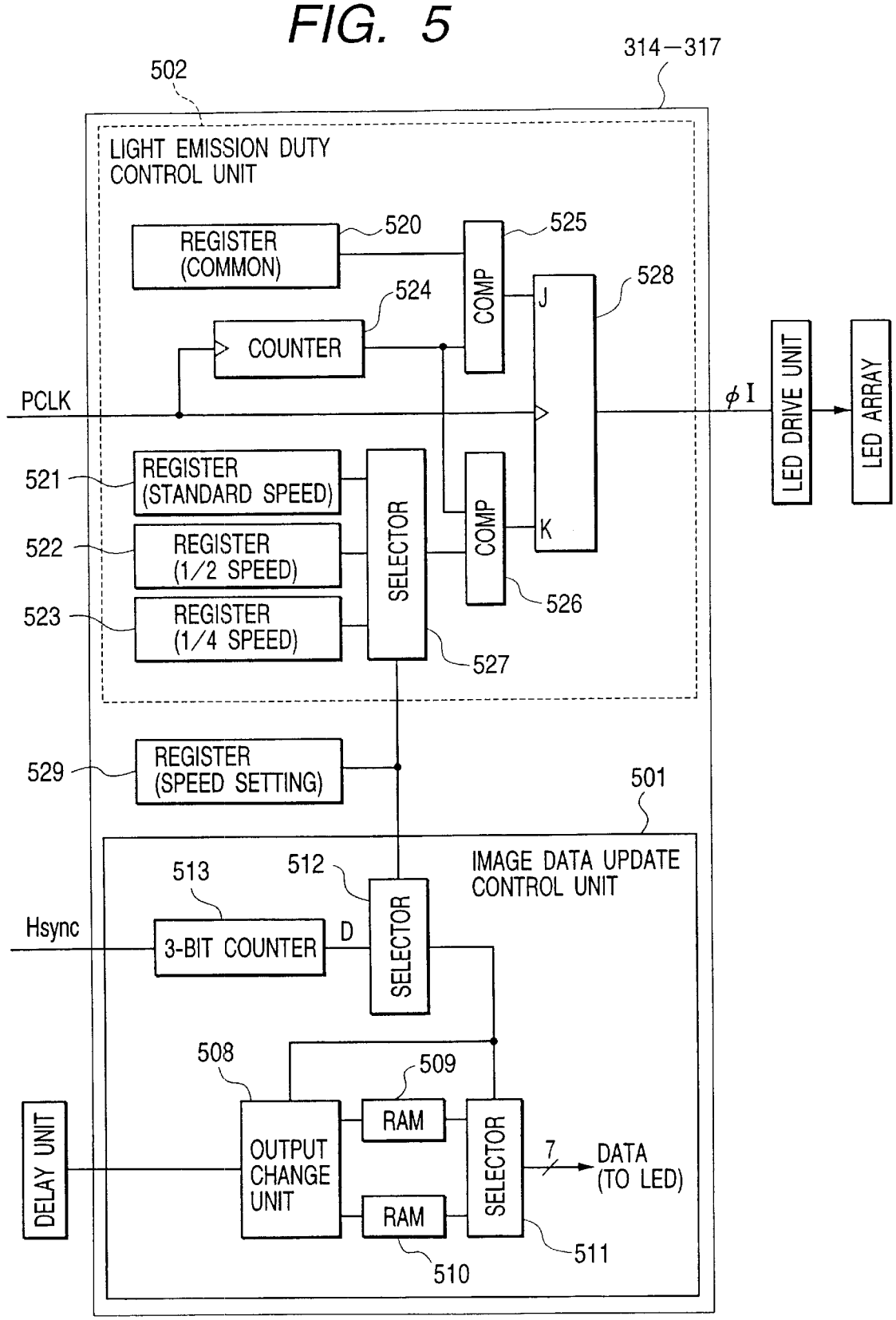

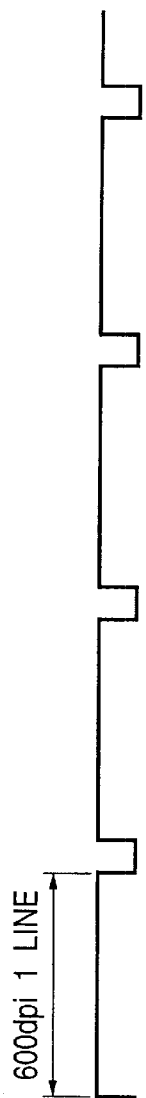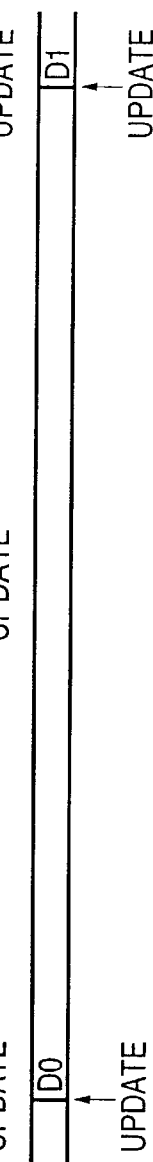

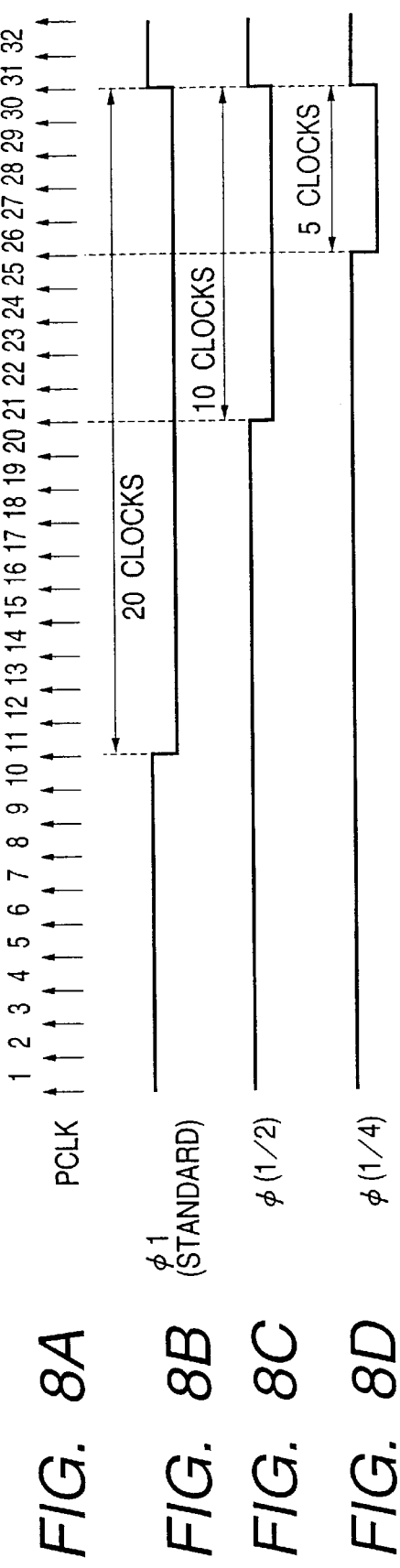

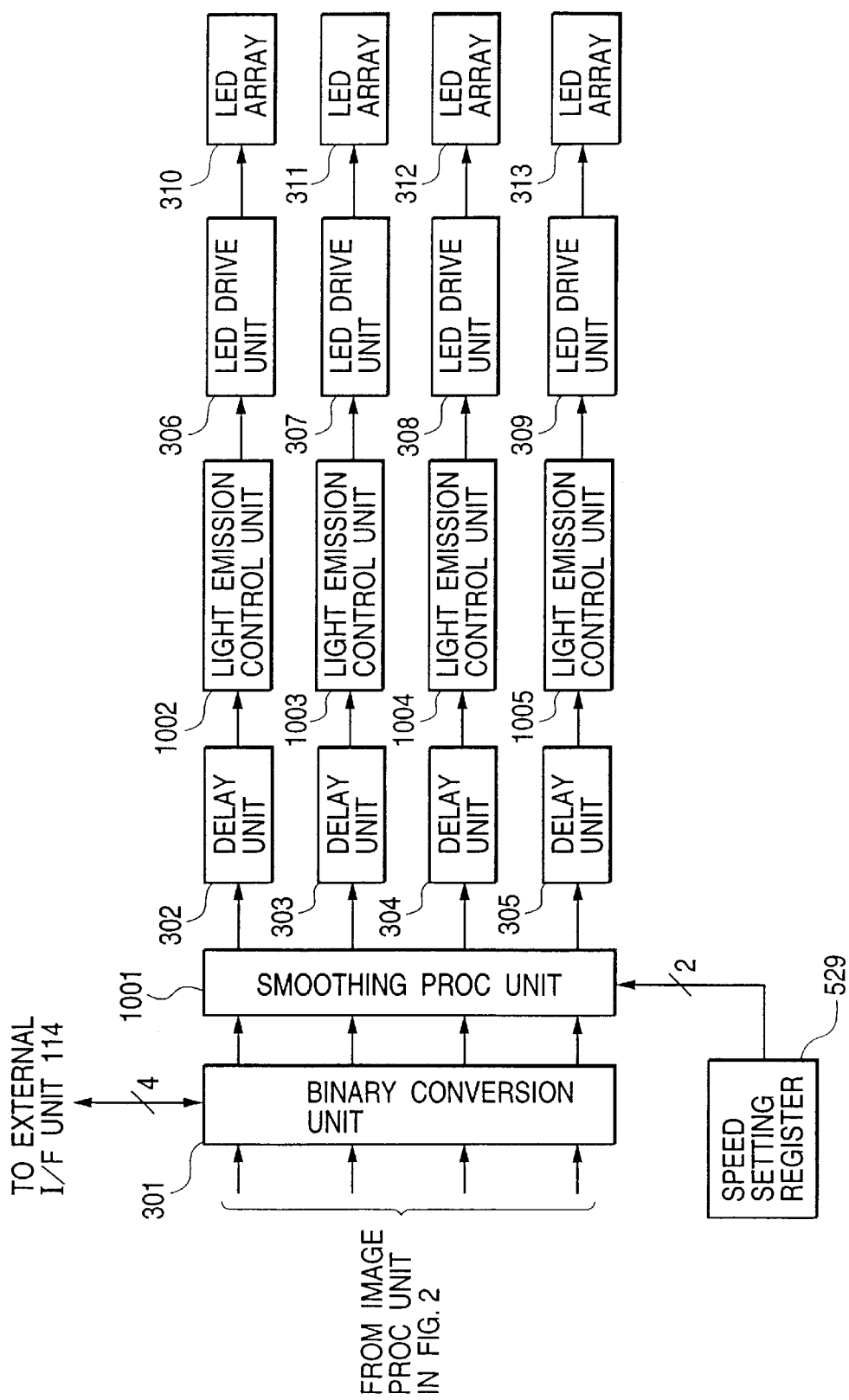

STANDARD SPEED
600dpi
600dpi
INPUT DATA

600dpi
1200dpi
OUTPUT DATA

FIG. 14A

OUTPUT OF REFERENCE TABLE FOR STANDARD SPEED

| D0_1 | D1_1 | D2_1 | D3_1 | D4_1 | D5_1 | D6_1 |
|---|---|---|---|---|---|---|
| D0_0 | D1_0 | D2_0 | D3_0 | D4_0 | D5_0 | D6_0 |

→ TIME

600dpi FOR 1 PIXEL

FIG. 14B

OUTPUT OF REFERENCE TABLE FOR 1/2 SPEED

| D0_3 | D1_3 | D2_3 | D3_3 | D4_3 | D5_3 | D6_3 |
|---|---|---|---|---|---|---|
| D0_2 | D1_2 | D2_2 | D3_2 | D4_2 | D5_2 | D6_2 |
| D0_1 | D1_1 | D2_1 | D3_1 | D4_1 | D5_1 | D6_1 |
| D0_0 | D1_0 | D2_0 | D3_0 | D4_0 | D5_0 | D6_0 |

→ TIME

600dpi FOR 1 PIXEL

FIG. 14C

OUTPUT OF REFERENCE TABLE FOR 1/4 SPEED

| D0_7 | D1_7 | D2_7 | D3_7 | D4_7 | D5_7 | D6_7 |
|---|---|---|---|---|---|---|
| D0_6 | D1_6 | D2_6 | D3_6 | D4_6 | D5_6 | D6_6 |
| D0_5 | D1_5 | D2_5 | D3_5 | D4_5 | D5_5 | D6_5 |
| D0_4 | D1_4 | D2_4 | D3_4 | D4_4 | D5_4 | D6_4 |
| D0_3 | D1_3 | D2_3 | D3_3 | D4_3 | D5_3 | D6_3 |
| D0_2 | D1_2 | D2_2 | D3_2 | D4_2 | D5_2 | D6_2 |
| D0_1 | D1_1 | D2_1 | D3_1 | D4_1 | D5_1 | D6_1 |
| D0_0 | D1_0 | D2_0 | D3_0 | D4_0 | D5_0 | D6_0 |

→ TIME

600dpi FOR 1 PIXEL

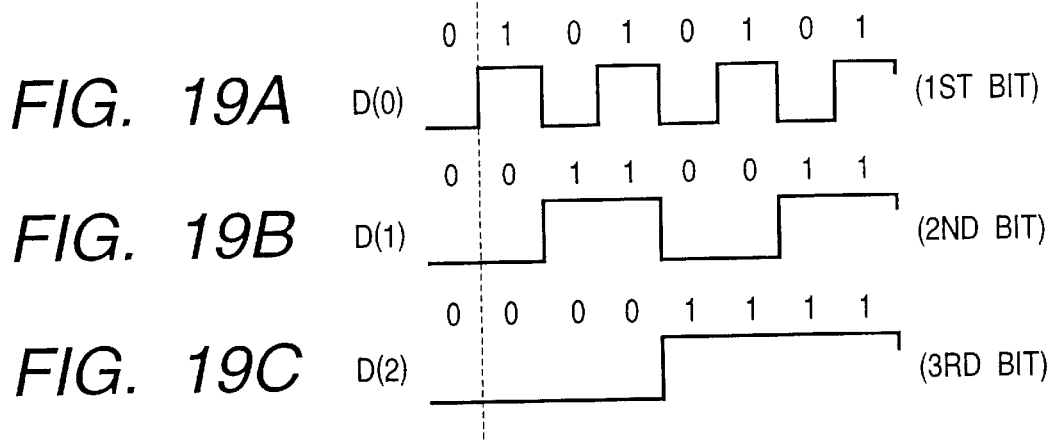
FIG. 19A
FIG. 19B
FIG. 19C
FIG. 21
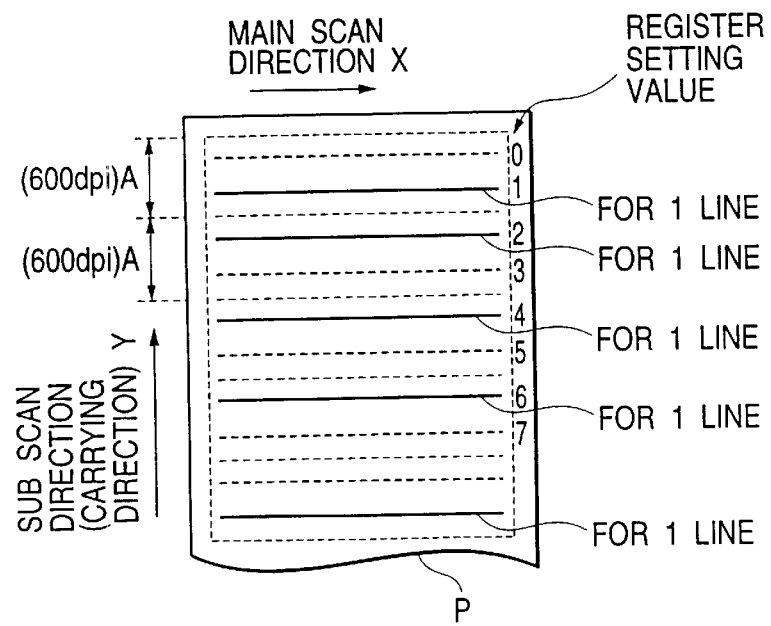
FIG. 22

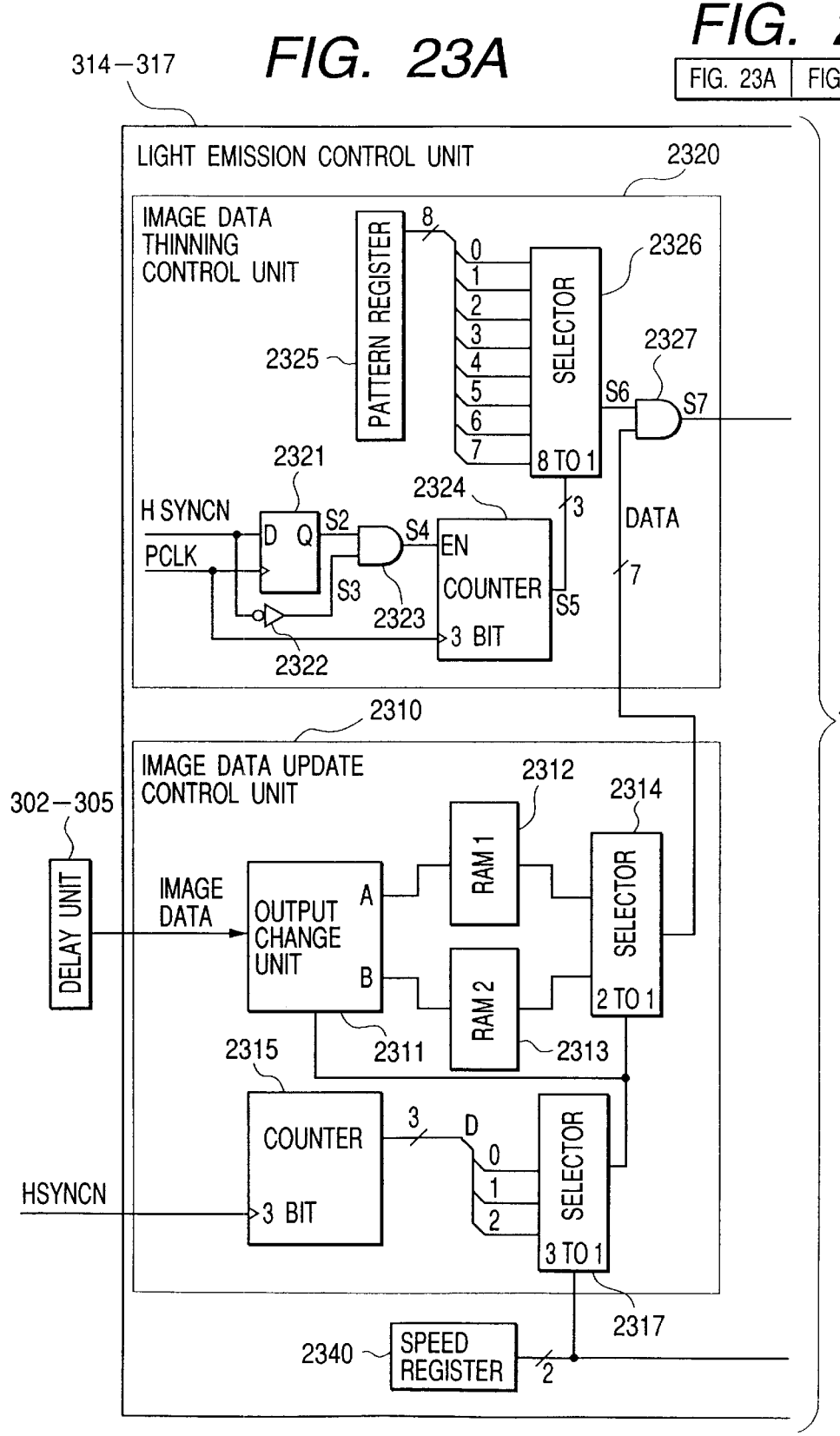

IMAGE FORMING APPARATUS AND RECORDING CONTROL DEVICE

BACKGROUND OF THE INVENTION

1. Field of the Invention

The present invention relates to a control device for a recording element array composed of plural solid-state recording elements such as light emitting elements arranged in an array, and an image forming apparatus for forming an image by such recording element array.

2. Related Background Art

There is already known an image forming apparatus provided with a printing head (recording control device) including a light emitting element array. The direction of array of the light emitting elements is usually taken in the main scanning direction perpendicular to the sub scanning direction, which is the conveying direction of the recording medium on which the recording is made.

In such conventional apparatus, the output image is compressed in the sub scanning direction when the process speed (for example the speed of the recording sheet in the conveying direction and/or the rotation speed of the photosensitive drum) is lowered.

Also the image density becomes higher in such case. Though such drawback in image density can be prevented by varying the high voltage outputs for latent image formation and for image development according to the process speed, the determination of such high voltage is difficult and results in an increase in the cost.

SUMMARY OF THE INVENTION

The object of the present invention is to resolve the drawbacks mentioned above.

The above-mentioned object can be attained, according to the present invention, by an image forming apparatus comprising:

a recording element array including plural recording elements arranged in an array;

image forming means for causing a relative movement between the recording element array and a recording medium thereby forming an image thereon;

drive means for driving the recording element array based on image data; and duty control means for varying the recording duty of the recording elements according to the relative movement speed between the recording element array and the recording medium.

According to the present invention, there is also provided an image forming apparatus comprising:

a recording element array including plural recording elements arranged in an array;

image forming means for causing a relative movement between the recording element array and a recording medium thereby forming an image thereon;

memory means for storing image data;

drive means for driving the recording element array based on the image data read from the memory means; and inhibition means for selectively inhibiting the recording operation by the image read from the memory means, according to the relative movement speed between the recording element array and the recording medium.

According to the present invention there is also provided an image forming apparatus comprising:

a recording element array including plural recording elements arranged in an array;

image forming means for causing a relative movement between the recording element array and a recording medium thereby forming an image thereon;

smoothing means for applying a smoothing process in the image data, according to the relative movement speed between the recording element array and the recording medium; and drive means for driving the recording element array, based on the image data subjected to the smoothing process by the smoothing means.

Other objects of the present invention, and the features thereof, will become fully apparent from the following detailed description which is to be taken in conjunction with the attached drawings.

BRIEF DESCRIPTION OF THE DRAWINGS

FIG. 5 is a block diagram of a light emission control unit of the first embodiment;

FIGS. 6A, 6B, 6C, 6D and 6E are timing charts showing the function of an image data update control unit of the first embodiment;

FIGS. 8A, 8B, 8C and 8D are timing charts showing a light emission timing signal in the first embodiment;

FIG. 10 is a block diagram of a signal processing unit in the printer unit in a second embodiment of the present invention;

FIGS. 14A, 14B and 14C are views showing a reference table;

FIGS. 19A, 19B and 19C are timing charts showing the function of data update control;

FIG. 21 is a view showing a pattern register;

FIG. 22 is a view showing an output image by the data thinning control; and

DETAILED DESCRIPTION OF THE PREFERRED EMBODIMENTS

Hereinafter, the present invention will be clarified in detail by embodiments thereof, with reference to the attached drawings.

First Embodiment

In the following there will be explained an embodiment of the present invention, applied to a binary recording digital color copying apparatus employing an LED (light emitting diode) array in the exposure system.

Figure 1:
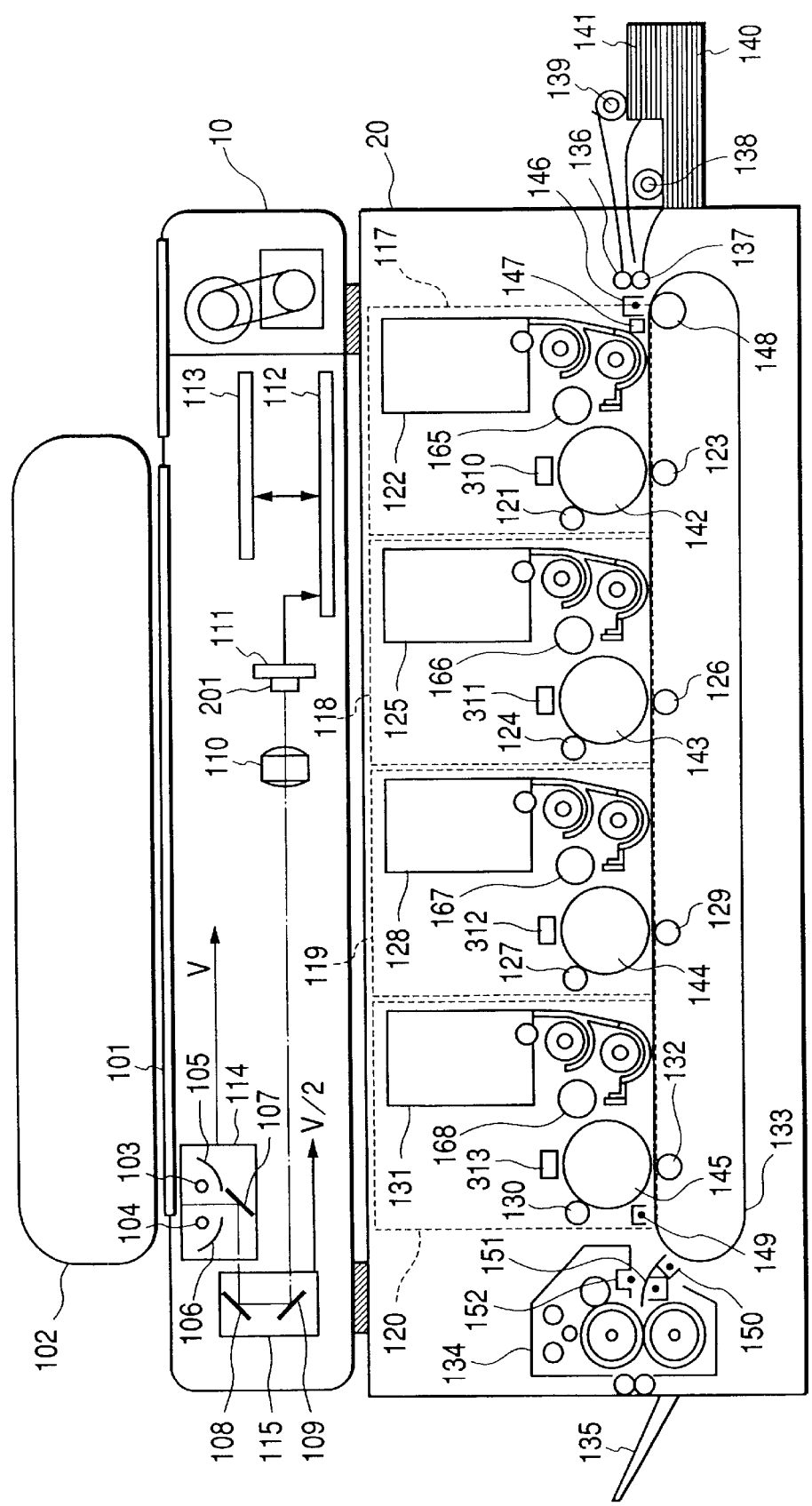
FIG. 1 is a schematic lateral cross-sectional view of a digital color copying apparatus (image forming apparatus) constituting a first embodiment.

FIG. 1 is a schematic lateral cross-sectional view of a digital color copying apparatus, composed of a color reader unit in the upper part and a color printer unit in the lower part.

At first there will be explained the configuration of the color reader unit, with reference to FIG. 1. In the color reader unit there are provided a CCD (charge-coupled device) 201, a board 111 on which the CCD 201 is mounted, and an image process unit 112. The image process unit 112 contains components shown in FIG. 2 except the CCD 201 and components 301, 302 to 305 in FIG. 3.

There are also provided an original supporting glass 101, and an original feeding device (document feeder: DF) 102. The document feeder DF may be replaced by a mirror-surface pressure plate (not shown). There are further provided light sources (halogen lamps or fluorescent lamps) 103, 104 for illuminating the original document; reflectors 105, 106 for condensing the light from the light sources 103, 104 to the original; mirrors 107 to 109; and a lens 110 for condensing the light reflected or projected from the original onto the CCD 201.

There are further provided an interface (I/F) unit 113 with another CPU or the like; a carriage 114 containing the halogen lamps 103, 104, the reflectors 105, 106 and the mirror 107; and a carriage 115 containing the mirrors 108, 109. The carriages 114, 115 are mechanically moved respectively with a velocity V and velocity V/2 in a direction perpendicular to the electrical (main) scanning direction of the CCD 201 to scan (sub scan) the entire surface of the original.

Figure 2:
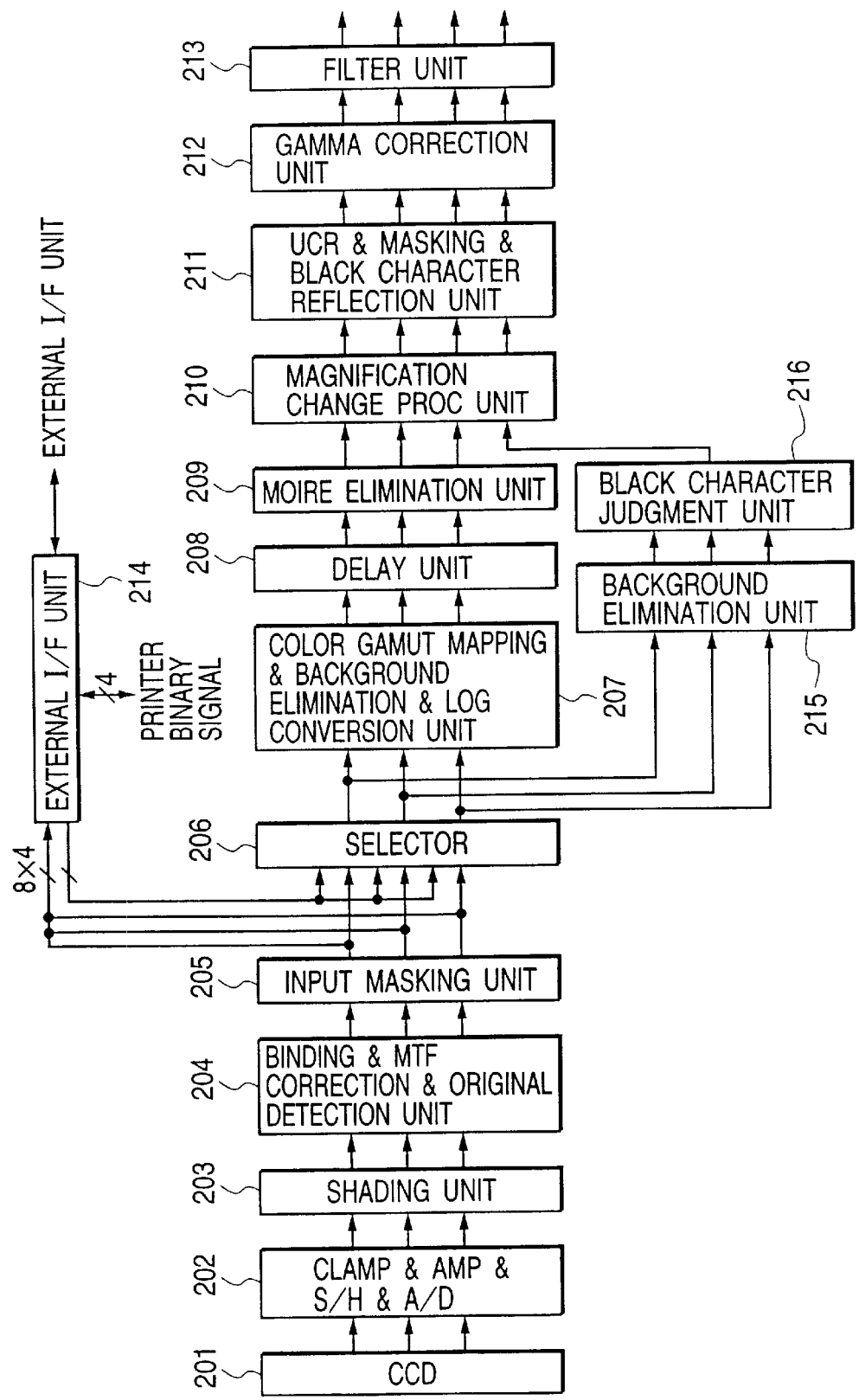
FIG. 2 is a block diagram showing the detailed configuration of a signal processing unit of the digital color copying apparatus of the first embodiment.

FIG. 2 is a block diagram showing the detailed configuration of a digital image processing unit 112.

The original on the original supporting glass 101 reflects the light from the light sources 103, 104, and the reflected light is guided to the CCD 201 and converted into an electrical signal therein. The CCD 201 is a color sensor, which can be either a one-line CCD having R (red), G (green) and B (blue) color filters thereon cyclically in line or a 3-line CCD respectively having R, G and B color filters. Also such color filters may be formed on chip or separately from the CCD.

The electrical signal (analog signal) from the CCD 201 is supplied to the image process unit 112 and is subjected to sample and holding (S/H) in a clamp and amplifier and S/H and A/D (analog-to-digital conversion) unit 202, whereby the dark potential of the analog image signal is clamped at a reference potential, then amplified to a predetermined level (these steps may be not necessarily executed in the order written above) and is subjected to A/D conversion to obtain digital signals for example of 8 bits for each of R, G and B.

These R, G and B signals are subjected to shading correction and black level correction in a shading unit 203, and is subjected to a predetermined processing in a binding and MTF (modulation transfer function) correction and original detection unit 204. More specifically, in case the CCD 201 is composed of a 3-line CCD, as the original reading position is different among the three lines, the delay amount among the three lines is adjusted by a binding process according to the reading speed, thereby correcting the signal timing so as to match the reading position for the three lines. Also, as the MTF of the image reading varies depending on the reading speed and the image magnification, such variation is corrected by the MTF correction. Furthermore, the original size is recognized by scanning the original on the original supporting glass 101.

The digital signal, of which reading position has been corrected, is subjected in an input masking unit 205 to the correction of the spectral characteristics of the CCD 201 and of those of the light sources 103, 104 and the reflectors 105, 106. The output of the input masking unit 205 is supplied to a selector 206, which can select an external I/F signal. The output of the input masking unit 205 is supplied to a color gamut mapping and background elimination and logarithmic conversion unit 207 and an background removal unit 215. The signal supplied to the background elimination unit 215 is subjected to background elimination and is supplied to a black character judgment unit 216 for judging whether the signal is a black character in the original, thereby generating a black character signal from the original.

The color gamut mapping and background elimination and logarithmic conversion unit 207, also receiving the output from the selector 206, executes color gamut mapping (or color space compression) and discriminates whether the read image signal is contained within the reproduction range of the printer, and, if not, corrects the image signal so as to be contained in the reproduction range of the printer. It then executes background elimination, and generates C (cyan), M (magenta) and Y (yellow) signals from the R, G and B signals by logarithmic conversion. Then the output signal from the color gamut mapping and background elimination and logarithmic conversion unit 207 is subjected to the adjustment of timing in a delay unit 208, thereby being matched in timing with the signal generated by the black character judgment unit 216. These two signals are subjected to the elimination of moire fringes in a moire elimination unit 209, and is changed in magnification in a magnification changing unit 210.

The C, M and Y signals after the magnification change are supplied to an UCR (under color removal) and masking and black character reflection unit 211 to execute a UCR process for generating C, M, Y and K (black) signals, which are corrected by a masking process to signals suitable for the output by the printer. The judgment signal generated by the black character judgment unit 216 is fed back to the C, M, Y and K signals. The signals processed in the UCR and masking and black character reflection unit 211 are subjected to density adjustment in a gamma correction unit 212, and is subjected to smoothing or edge processing in a filter unit 213.

Figure 3:
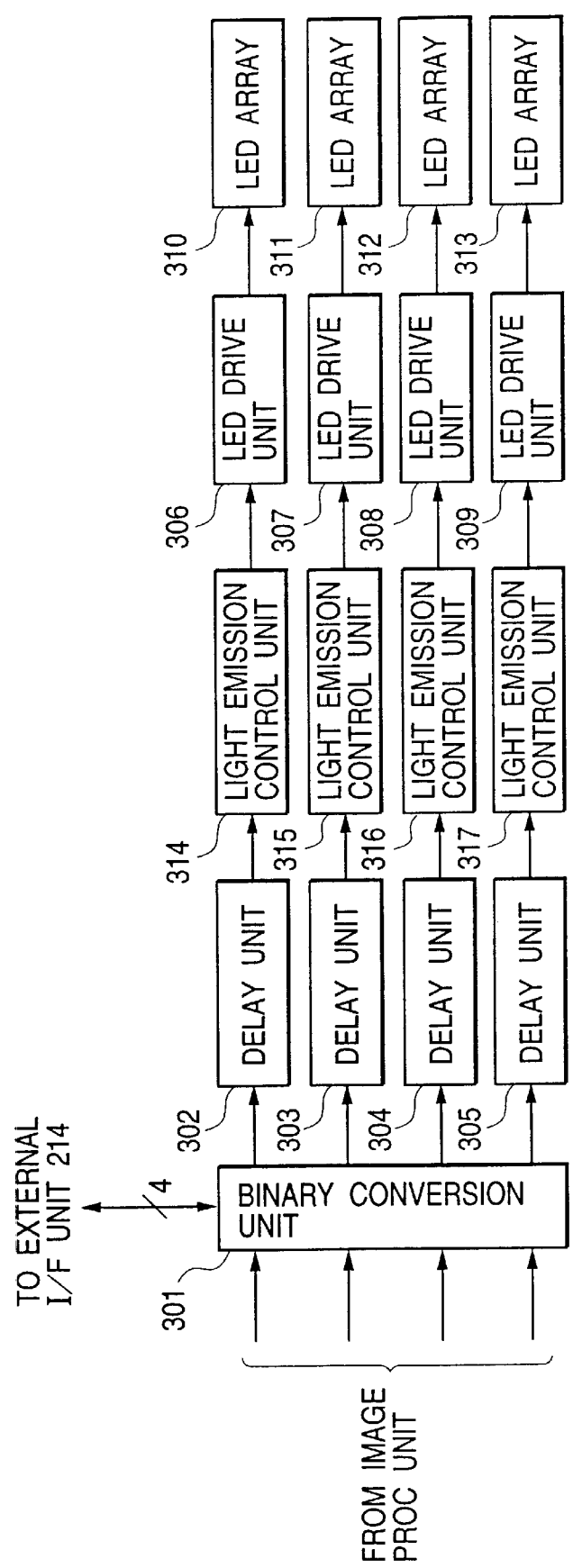
FIG. 3 is a block diagram of a signal processing unit in the printer unit of the first embodiment.

The signal processed in the image process unit 112 as explained in the foregoing is converted in a binary conversion unit 301 shown in FIG. 3 from a multi-value signal of 8 bits into a binary signal. The binary conversion unit 301 executes conversion into the binary signal for example by dither method, but such conversion is not limited to the dither method but can also be achieved by the error dispersion method or the improved error dispersion method.

Subsequently, reference is made again to FIG. 1 for explaining the configuration of the color printer unit. In the color printer unit shown in the lower part of FIG. 1, there are provided a Y image forming unit 117, an M image forming unit 118, a C image forming unit 119 and a K image forming unit 120, each of which executes image formation of the respective color by the known electrophotographic process, thereby printing a color image in the color copying operation. As these image forming units have a same configuration, there will be explained the Y image forming unit 117 only, and other image forming units will not be explained further.

In the Y image forming unit 117, a photosensitive drum 142 is driven by an ultrasonic motor (not shown). A primary charger 121 charges the surface of the photosensitive drum 142, thereby preparing for latent image formation. The latent image is formed by exposing the surface of the photosensitive drum 142 to the light from an LED array 310. A development unit 122 develops the latent image on the photosensitive drum 142 to form a visible toner image. The development unit 122 contains a sleeve 165 for developing the latent image under the application of a developing bias. A transfer charger 123 executes discharge from under a transfer belt 133, thereby transferring the toner image from the photosensitive drum 142 onto a recording sheet placed on the transfer belt 133.

The apparatus of the present embodiment is not provided with a cleaner unit in the image forming unit because of a satisfactory transfer efficiency, but there may be provided such cleaner unit. In other image forming units 113 to 120, there are provided photosensitive drums 143 to 145, LED arrays 311 to 313, primary chargers 124, 127, 130, development units 125, 128, 131, sleeves 166 to 168, and transfer chargers 126, 129, 132.

In the following there will be explained the procedure of forming the image on the recording sheet or the like. The recording sheet contained in cassettes 140, 141 is fed one by one by pickup rollers 139, 138 and is supplied by feed rollers 136, 137 onto the transfer belt 133. The recording sheet thus fed is charged by an attraction charger 146. A transfer belt roller 148 drives the transfer belt 133 and charges the recording sheet in cooperation with the attraction charger 146, whereby the recording sheet is attracted to the transfer belt 133. A front end sensor 147 detects the front end of the recording sheet on the transfer belt 133.

The detection signal of the front end sensor 147 is sent from the color printer unit to the color reader unit and is utilized as the sub scanning synchronization signal in sending the image signal from the color reader unit to the color printer unit.

The recording sheet after the front end detection is conveyed by the transfer belt 133 and is subjected, in the image forming units 117 to 120, to the formation of toner images thereon in the order of Y, M, C and K images whereby a color image is formed. The recording sheet after passing the K image forming unit 120 is subjected to charge elimination by an elimination charger 149 for facilitating the separation from the transfer belt 133, and is then separated therefrom. A peeling charger 150 avoids perturbation in the image by the peeling discharge at the separation of the recording sheet from the transfer belt 133. The separated recording sheet is charged by pre-fixing chargers 151, 152 for preventing the perturbation in image by enhancing the attraction force of the toner, then subjected to thermal fixation of the toner images by the fixing unit 134 and is discharged to a discharge tray 135.

In the following there will be explained the image recording utilizing LED's.

The YMCK binary image signals generated in the image process unit 112 shown in FIGS. 2 and 3 are adjusted, respectively by delay units 302 to 305, for the differences in the distance between the sheet front end sensor and the respective image forming units, based on the sheet front end signal from the front end sensor 147, in order to print the four colors in a predetermined position. Thereafter the image signals are supplied, through light emission control units 314 to 317 to be explained later, to LED drive units 306 to 309, which respective generate signals for driving LED arrays 310 to 313 thereby driving such LED arrays in the respective color image forming units. Each LED array contains plural light emitting elements arranged in an array.

In the following there will be explained, with reference to FIG. 5, the light emission control units 314 to 317 featuring the present embodiment.

The digital color copying apparatus (image forming apparatus) of the present embodiment is rendered capable of varying the process speed according to the kind of the recording medium, and also varying the conveying speed etc. relating to the process speed. The process speed is defined by the rotation speed of the photosensitive drum and/or the conveying speed of the recording sheet. Such feature is based on the following difference in the fixing characteristics. A recording sheet of a large thickness (thick paper), absorbing a large amount of heat in the fixing unit, excessively lowers the temperature of the fixing roller to result in insufficient fixation if such sheet is passed with a process speed same as that for the ordinary paper. Also an OHP (overhead projection) sheet, if passed with a speed same as that for the ordinary paper, shows an image with insufficient light transmission because the toner is not completely fused. In the digital color copying apparatus of the present embodiment, therefore, such difference in the fixing characteristics is covered, taking the process speed for the ordinary paper as the standard speed, by setting the speed for the thick paper at ½ of the standard speed (hereinafter called ½ speed), and the speed for the OHP sheet at ¼ of the standard speed (hereinafter called ¼ speed).

Figure 4A:
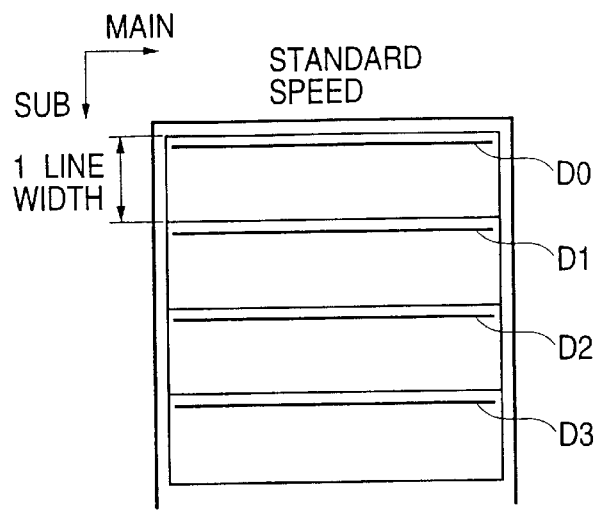
FIGS. 4A, 4B and 4C are views showing examples of output image when the present invention is not exploited.
Figure 4B:
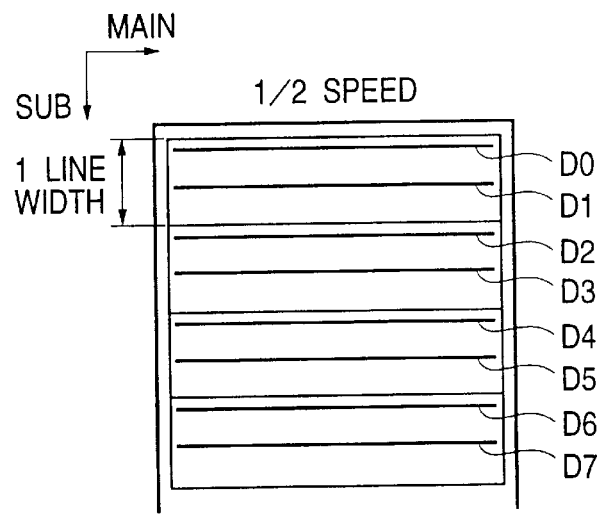
Figure 4C:
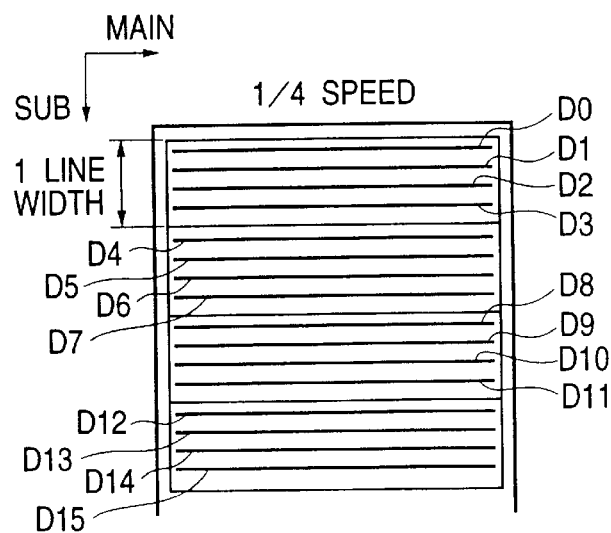

If the light emission intensity of the LED is maintained same when the process speed is changed as explained above, there will result the following drawback. More specifically, if the printing is executed at a speed lower than the standard speed, with the data D0 to D3 which provide a print shown in FIG. 4A at the standard speed, the line pitch in the sub scanning direction (sheet conveying direction) is compressed narrower than at the standard process speed. At the ½ speed, the image corresponding to the data D0 to D3 is compressed to ½ in the sub scanning direction as shown in FIG. 4B, and, at the ¼ speed, it is composed to ¼ as shown in FIG. 4C.

Therefore, in order to obtain an uncompressed pitch same as at the standard process speed, the present embodiment executes light emission duty control by the configuration shown in FIG. 5.

An image data update control unit 501 controls the updating of the image data of each line.

The serial image data outputted from one of the delay units 302 to 305 shown in FIG. 3 are supplied to an output switching unit 508, which executes switching by an update timing signal from a selector 512, and the output of the output switching unit 508 is written alternately in a RAM 509 and a RAM 510 consisting of line memories. The RAM's 509, 510 store the data obtained by rearranging the raster data, serially transferred from the delay units 302 to 305, by a rearrangement unit (not shown) according to the order of light emission of the LED's. The output data from the RAM's 509, 510 are selectively supplied to the LED drive units 306 to 309 shown in FIG. 3 by a selector 511 controlled by an update timing signal outputted from the selector 512, whereby the LED arrays 310 to 313 are driven by such data.

The selector 512 receives a count D of a 3-bit counter 513 for the main scanning synchronization signal SYNCN (having a cycle period of a line of 600 dpi) and a set value of a speed setting register 529, and generates the above-mentioned update timing signal for determining the timing of switching of the output switching unit 508 and the selector 511. The speed setting register 529 is composed of a 2-bit register, having "0" for the standard speed, "01" for the ½ speed and "10" for the ¼ speed. The selector 512 outputs D(0), D(1) or D(2) respectively for the set value "00" or "01" of the speed setting register 529.

These outputs are also supplied to a page memory control unit (not shown) to also control the timing of data reading from the page memory. The timing of data reading from the RAM's 509, 510 is maintained constant regardless of the process speed.

The presence of the image data update control unit 501 of the above-described configuration allows to dispense with the data updating for each line by the main scanning synchronization signal HSYNCN even when the process speed is reduced to the ½ or ¼ speed.

FIGS. 6A, 6B, 6C, 6D and 6E are timing charts showing the update timing by the image data update control unit 501.

With respect to the main scanning synchronization signal SYNCN (FIG. 6A) and the count output D (FIG. 6B), the data DATA outputted from the selector 512 is updated for every line when the process speed is at the standard speed (FIG. 6C). On the other hand, for the ½ speed, the data are updated for every 2 lines with a doubled period of updating (FIG. 6D), and, for the ¼ speed, the data are updated for every 4 lines with a quadrupled period of updating (FIG. 6E). Thus the timing of image data updating is changed according to the process speed.

Figure 7A:
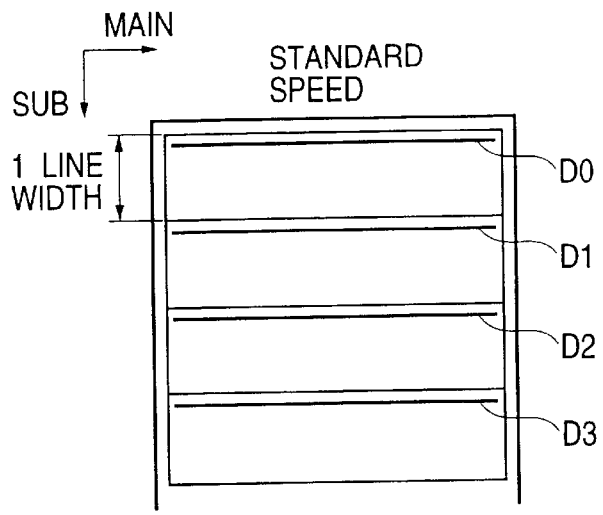
FIGS. 7A, 7B and 7C are views showing the effect of update timing control in the first embodiment.
Figure 7B:
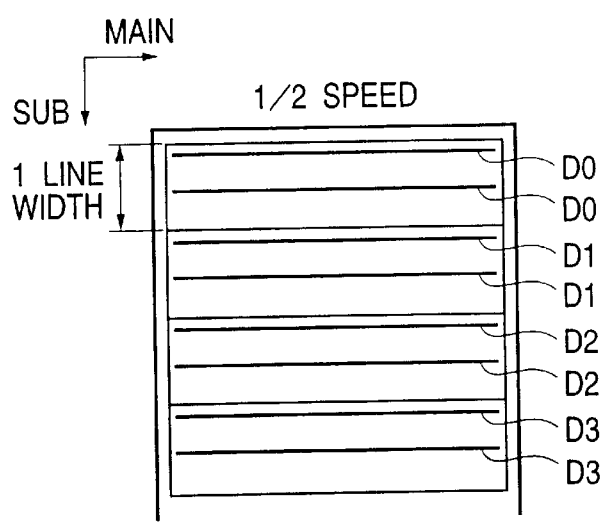
Figure 7C:
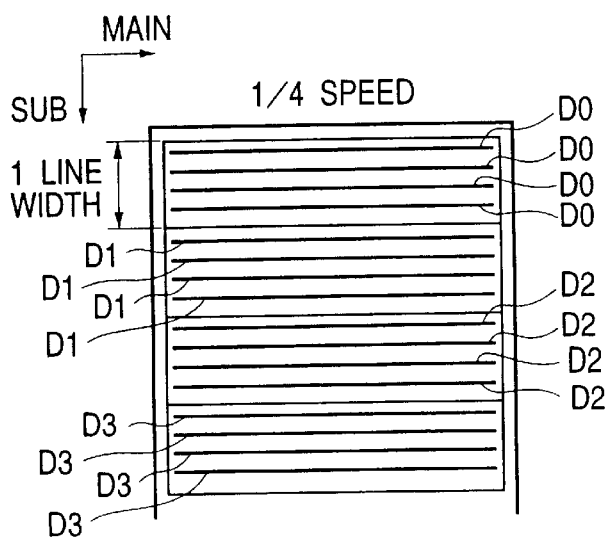

The output images obtained under such control are shown in FIGS. 7A, 7B and 7C.

With such variable timing of data updating as shown in FIGS. 6A to 6E, the image, which is formed under updating for every line at the standard speed (FIG. 7A), is formed at the ½ speed under updating for every 2 lines but with a width same as a line in the recording of standard speed (FIG. 7B), and, at the ¼ speed, under updating for every 4 lines but with a width same as a line in the recording of standard speed (FIG. 7C). It is thus made possible to avoid the image compression in the sub scanning direction, resulting from the change in the process speed.

In the situations shown in FIGS. 7B and 7C, the image size in the sub scanning direction can be made same as that at the standard speed. However, the image density becomes 2 or 4 times of that at the standard speed, respectively in the ½ or ¼ speed. Such change in the image density is resolved by executing the following light emission duty control featuring the present invention.

The light emission duty control of the present embodiment is executed by the light emission duty control unit 502 shown in FIG. 5. This control by the light emission duty control unit 502 will be explained with reference to FIG. 5.

The light emission duty control unit 502 generates a light emission timing control $\Phi 1$, and the LED arrays 310 to 313 emit light when the light emission timing signal $\Phi 1$ is at the low level state. The timing of the light emission timing signal $\Phi 1$ is set in plural levels by the registers 520 to 523, and a selector 527 selects one of such plural settings according to the process speed. The light emission timing signal $\Phi 1$ is generated by the comparison of thus selected value and the reference clock signal.

In more details, the register 520 sets the timing of leading edge of the light emission timing signal $\Phi 1$, and sets a constant timing for the leading edge, regardless of the process speed. It is now assumed to set "30(D)" in the register 520. The registers 521 to 523 set the timing of trailing edge of the light emission timing signal $\Phi 1$ and respectively contain values for the standard speed, ½ speed and ¼ speed. In the present example, the registers 521, 522, 523 are assumed to respectively contain "10(D)", "20(D)" and "25(D)". In the present specification, "N(D)" indicates a binary number corresponding to a decimal number N.

A counter 524 is a 5-bit number capable of counting up to a binary number "11111" (corresponding to a decimal number $2^5$=32). The counter 524 receives the image transfer clock signal PCLK which is the reference system clock signal, and executes the counting operation as will be explained in the following. One of the set values of the registers 521 to 523, selected by the selector 527 according to the output of the process speed setting register 529 is compared with the count output of the counter 524 by a comparator 526, which provides a high-level output when both are equal.

Also a comparator 525 compares the set value of the register 520 with the count output of the counter 524, and provides a high-level output when both are equal. The output of the comparator 525 is supplied to the J port of a JK flip-flop 528 to determine the timing of leading edge of the light emission timing signal $\Phi 1$. Also the output of the comparator 526 is supplied to the K port of the JK flip-flop 528 to determine the timing of trailing edge of the light emission timing signal $\Phi 1$.

FIGS. 8A, 8B, 8C and 8D are timing charts showing the timing thus generated light emission timing signal $\Phi 1$, wherein FIG. 8A shows the counting of the PCLK signal by the counter 524.

Figure 9A:
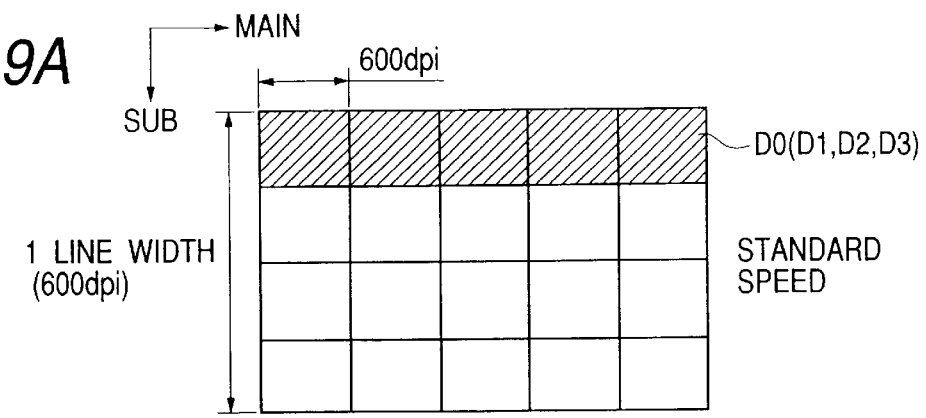
FIGS. 9A, 9B and 9C are schematic views showing final output images in the first embodiment.
Figure 9B:
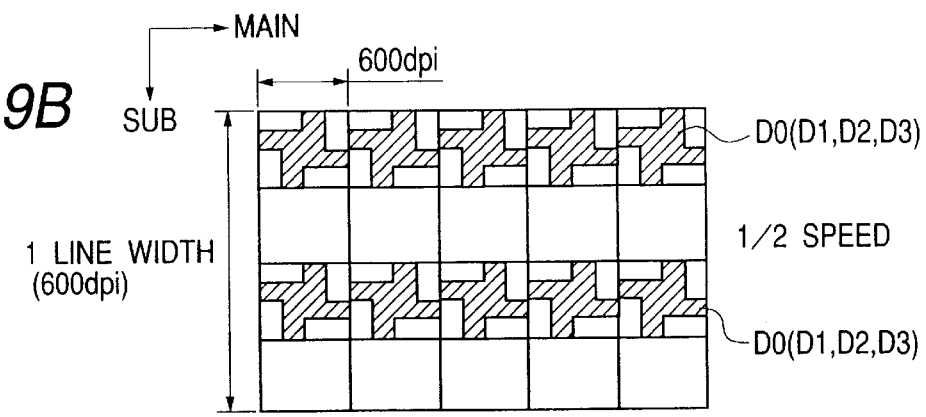
Figure 9C:
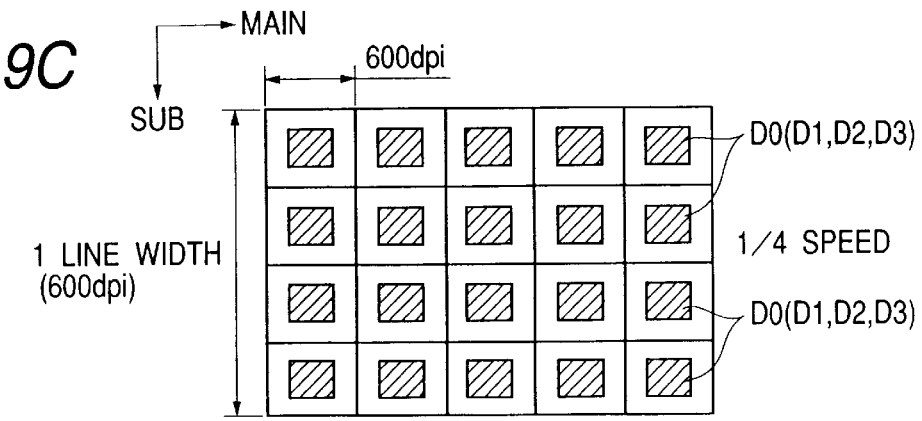

As shown in FIGS. 8B to 8D, the light emission time becomes a period of 20 counts from 11 to 30 for the standard speed (FIG. 8B), a period of 10 counts from 21 to 30 for the ½ speed (FIG. 8C), and a period of 5 counts from 26 to 30 for the ¼ speed (FIG. 8D). In this manner the light emission time or the exposure amount is in proportion to the process speed. FIGS. 9A, 9B and 9C schematically show an example of the printer under the light emission duty control with the timings shown in FIGS. 8A to 8D.

In case a line width of the recording medium is scanned once with an exposure of 100% at the standard speed shown in FIG. 9A, the recording with the ½ speed shown in FIG. 9B is achieved by forming the same line width with two scans and with an exposure of 50%, and the recording with the ¼ speed shown in FIG. 9C is achieved by forming the same line with four scans and with an exposure of 25%.

As shown in FIGS. 9A to 9C, the image data update control and the light emission duty control, explained in the foregoing and featuring the present embodiment, allow to obtain a constant image density printed on the recording medium, regardless of the fixing characteristics thereof and using a constant high voltage setting even under the variation in the process speed, thereby obtaining the output image in stable manner.

As explained in the foregoing, in case of a change in the process speed, the first embodiment controls the light emission duty ratio of the light emitting elements according to such process speed, thereby maintaining a constant density of the output image while utilizing a constant high voltage setting, thus constantly recording the output image in stable manner on the recording medium.

Second Embodiment

As explained in the first embodiment, when the process speed is reduced from the standard speed to the ½ or ¼ speed, the line density increases to 2 or 4 times since the light emission speed in the main scanning direction is constant. In such situation, a higher smoothing effect can be obtained for a lower process speed, by changing the smoothing method according to the process speed.

Such embodiment will be explained in the following.

The configuration of the digital color copying apparatus in the present embodiment is similar to that shown in FIGS. 1 and 2, but a portion corresponding to FIG. 3 is replaced by a configuration shown in FIG. 10.

At first the second configuration will be explained with reference to FIG. 10, which is to replace the configuration shown in FIG. 3 in the first embodiment. The configuration shown in FIG. 10 is different from that in FIG. 3 in a smoothing process unit and the light emission control unit, but is same in other portions. The binary YMCK image signals generated in the image process unit in FIG. 2 are subjected to a smoothing process in a smoothing process unit 1001, according to the process speed. The data after smoothing are subjected to the adjustments, based on the sheet front end signal from the front end sensor 147, in the delay units 302 to 305 for the differences in the distance from the sheet front end sensor and the respective image forming units, in order to record four colors in the predetermined position. The image signals are then supplied, through light emission control units 1014 to 1017, to the LED drive units. The configuration of the light emission control units 1014 to 1017 is similar to that shown in FIG. 5. The LED driving units generate signals for driving the LED arrays 310 to 313.

Figure 11:
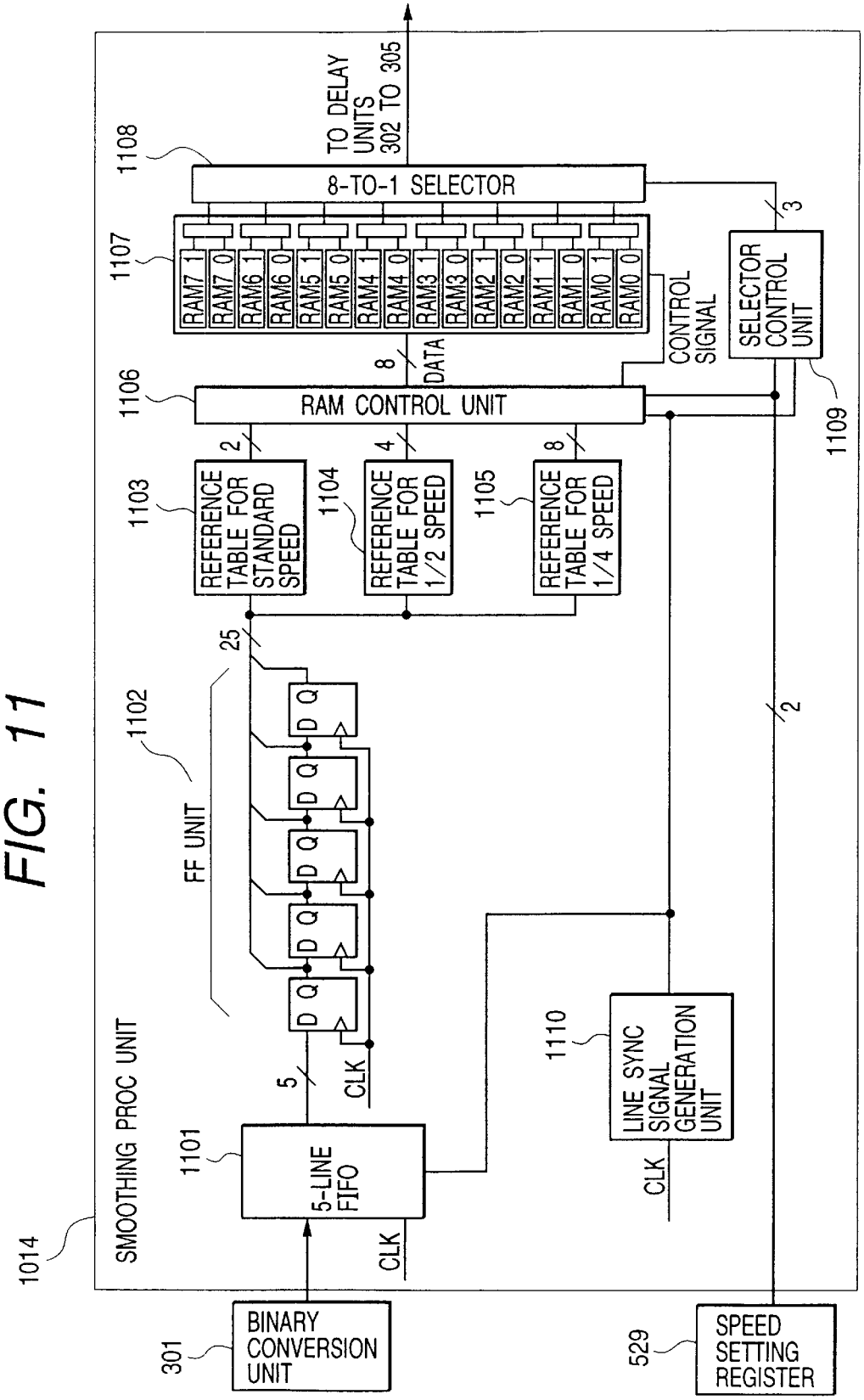
FIG. 11 is a block diagram of a smoothing process unit in the second embodiment.
Figure 12A:
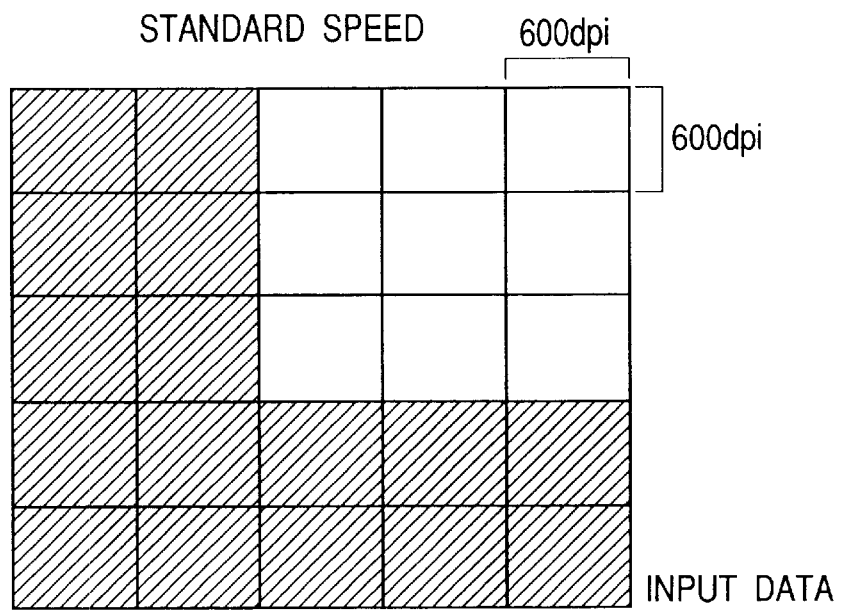
FIGS. 12A and 12B are views showing the smoothing process.
Figure 12B:
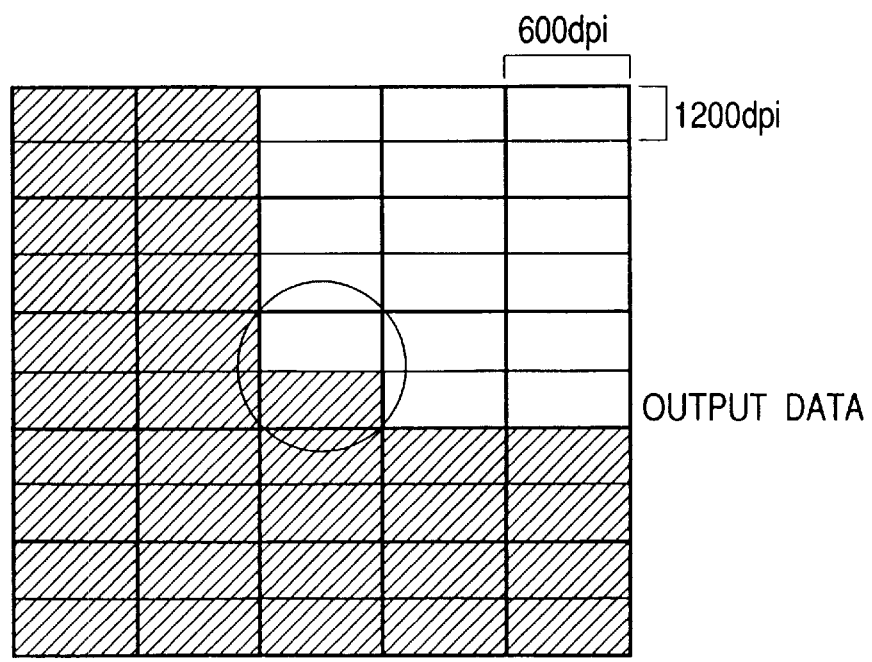

Now the smoothing process unit 1001 will be explained with reference to FIG. 11. The image data, after conversion into binary data in the binary conversion unit 301, are entered into a 5-line FIFO 1101. The 5-line FIFO is employed in the present embodiment because the smoothing process therein utilizes a filter of 5×5 pixels, and an n-line FIFO is naturally to be used if the smoothing process utilizes a filter of n×n pixels. 5-bit data outputted from the 5-line FIFO 1101 are supplied to a flip-flop 1102, which also receives the image clock signal CLK. The flip-flop 1102 provides an output of a 5×5 area, which is branched into three and entered in parallel manner to a standard speed reference table 1103, a ½ speed reference table 1104 and a ¼ speed reference table 1105. In the following there will be explained an example of such reference tables. At first, for the standard speed, in response to the input data of 600 dpi in the main and sub scanning direction as shown in FIG. 12A, there are outputted, for the purpose of smoothing, data for printing the lower half only of the object pixel as shown in FIG. 12B. More specifically, the standard speed reference table contains such a pattern, in response to the input data "11000 11000 11000 11111 11111", as to output 2-bit data "01". The digital color copying apparatus of the present embodiment executes printing for data "1" and does not execute printing for data "0".

Figure 13A:
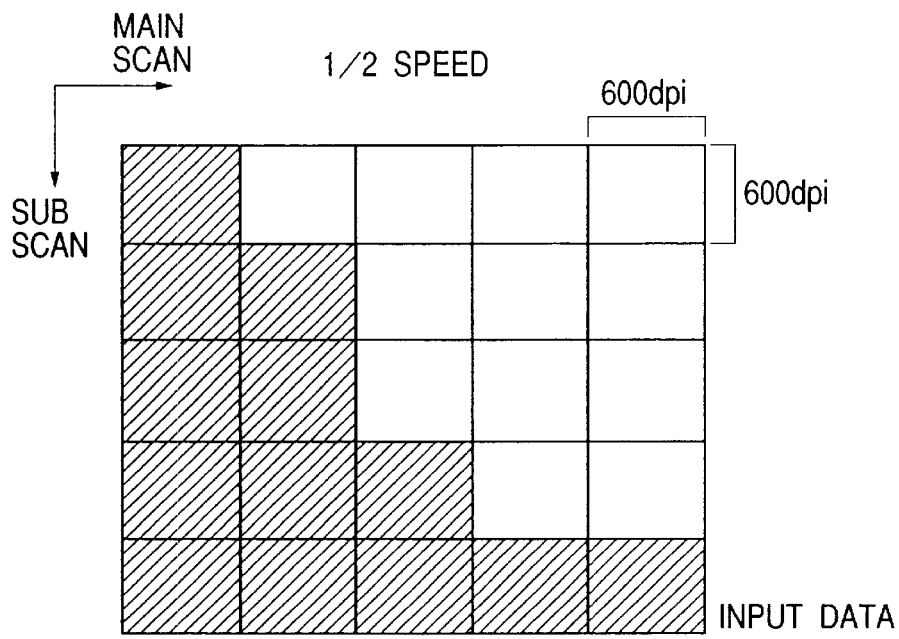
FIGS. 13A and 13B are views showing the smoothing process.
Figure 13B:
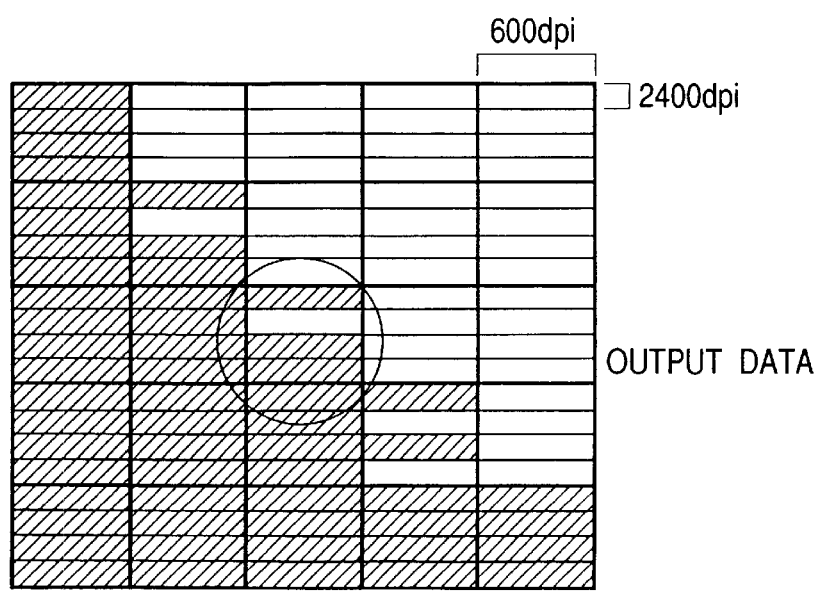

For the ½ process speed, in response to the input data shown in FIG. 13A, there is obtained an output as shown in FIG. 13B. More specifically, the ½ speed reference table contains such a pattern, in response to the input data "10000 11000 11000 11100 11111", as to output 4-bit data "1011". Thus, as shown in FIGS. 14A, 14B and 14C, for printing a pixel of the image of 600 dpi, there are employed data of 2 bits at the standard speed, 4 bits at the ½ speed or 8 bits at the ¼ speed. Each of the reference tables for the standard speed, ½ speed and ¼ speed contains 128 such patterns.

The data outputted from the reference tables through the above-described process are supplied to a RAM control unit 1106, which controls a line memory 1107 and also receives a line synchronization signal generated by a line sync signal generation unit 1110 and a speed designation signal from a speed setting register 1015. The RAM control unit 1106 selects the data from the three reference tables according to the speed designation signal, and such data are outputted and written in synchronization with the line synchronization signal. The order of addressing in the data writing are not from the 0th address but in an order of 0, 1, 2, . . . , 31, 0, 1, 2, . . . , 31, 0, 1, 2, . . . , 31, 0, 1, 2, . . . , 31, 32, 33, . . . , 63, . . . , 255 because the LED array employed in the present embodiment is not turned on sequentially in the main scanning direction from the 0-th pixel but from the first pixel of each of the 56 LED chips constituting a line, and also because the 1-bit signals entering each RAM are written in the RAM of a 28-bit width. The data reading is executed also in synchronization with the line synchronization signal, but with an addressing order of 0, 32, 64, . . . , 244, 0, 32, 64, . . . , 244, 0, 32, 64, . . . , 244, 0, 32, 64, . . . , 244, 1, 33, . . . , 225, . . . , 255. The line memory 409 is composed of RAM' of 16 lines, of which each line is composed of 28 bits by 255 words. The RAM's 0__0 to 1__1 are used at the standard speed, those 0__0 to 3__1 are used at the ½ speed and all the RAM's are used at the ¼ speed. The RAM's x__0 and x__1 are provided as a pair, which is so constructed that one is written while the other is read.

Figure 15:
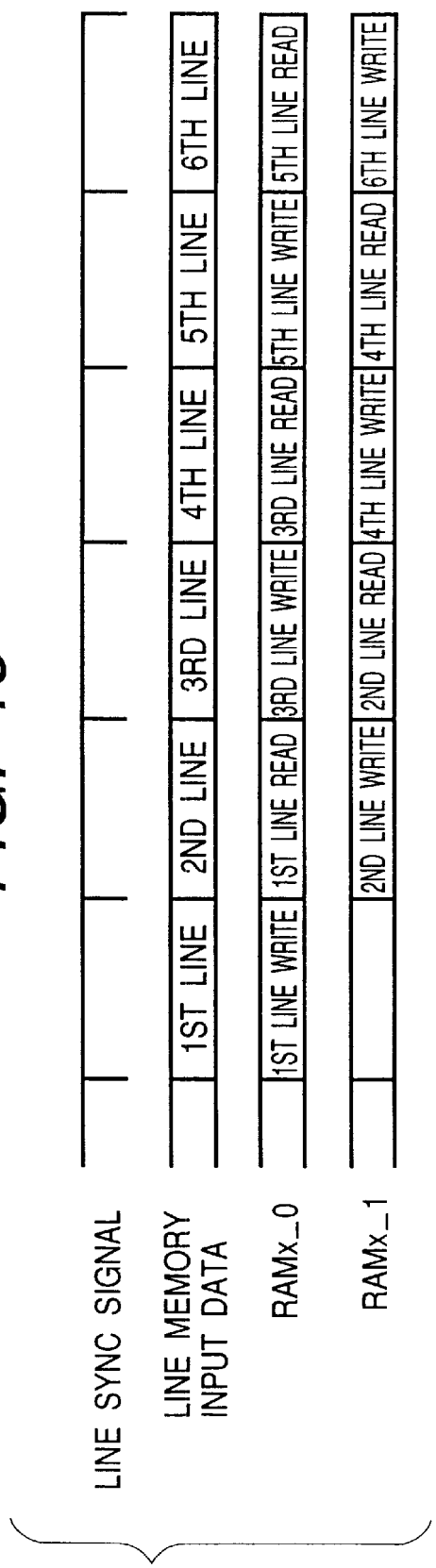
FIG. 15 is a timing chart showing the function of a RAM.

FIG. 15 shows the timing of such operation. The data from the line memory are selected in succession by an 8-to-1 selector controlled by a selector control unit 1109 to generate 1-bit signals which are supplied to the delay units. A the standard speed, the data are switched in the order of RAM0, RAM1, RAM0, RAM1, . . . in synchronization with the line sync signal. At the ½ speed, the switching is made in the order of RAM0, RAM1, RAM2, RAM3, RAM0, . . . , and, at the ¼ speed, the switching is made in the order of RAM0, RAM1, RAM2, RAM3, RAM4, RAM5, RAM6, RAM7, RAM0, . . . .

Figure 16:
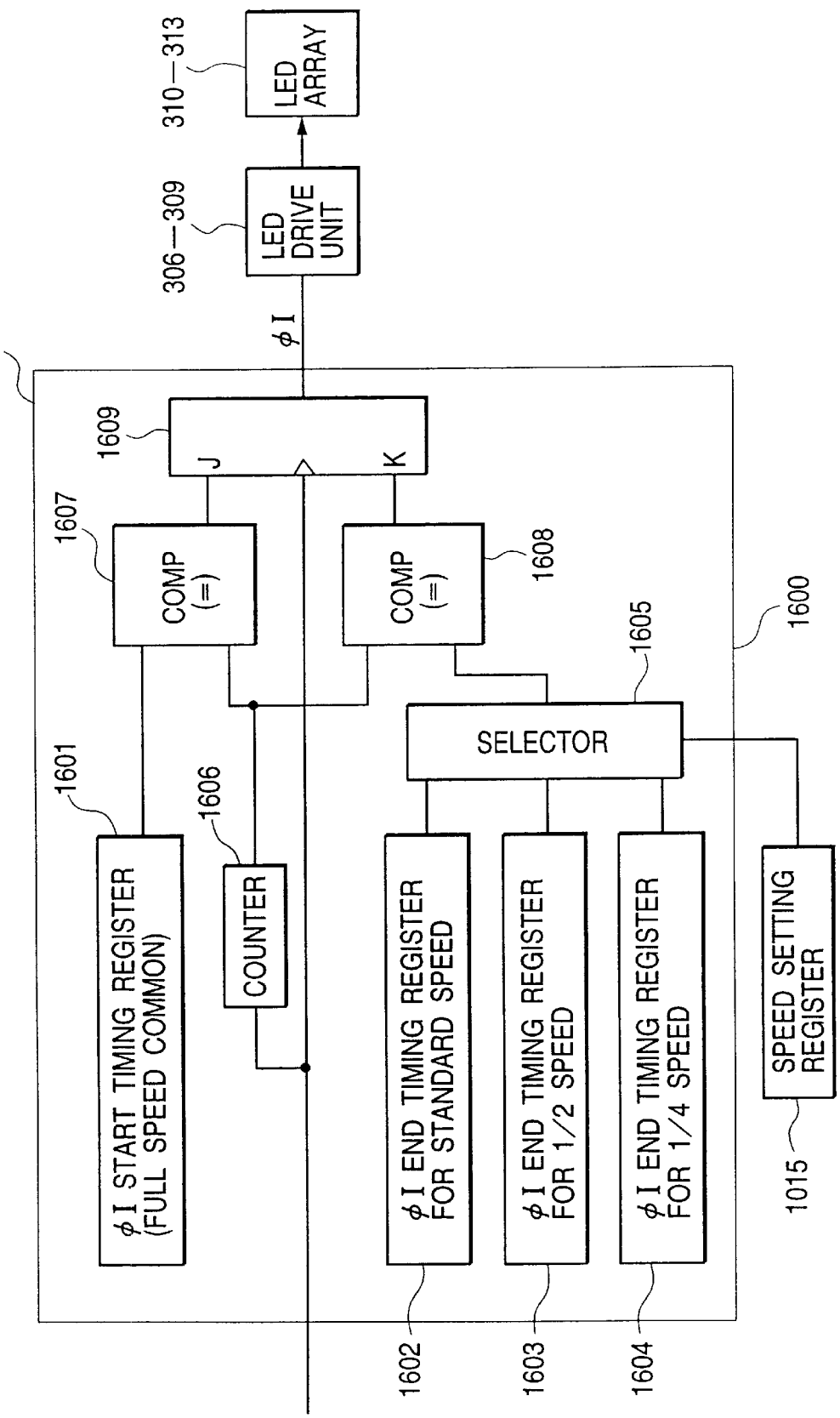
FIG. 16 is a block diagram of a light emission control unit.

In the following there will be explained, with reference to FIG. 16, the light emission control units 1002 to 1005 for controlling the light emission of the LED arrays according to the process speed. The configuration shown in FIG. 16 is different from that in FIG. 5, mainly in the deletion of the image data update control unit.

Figure 17:
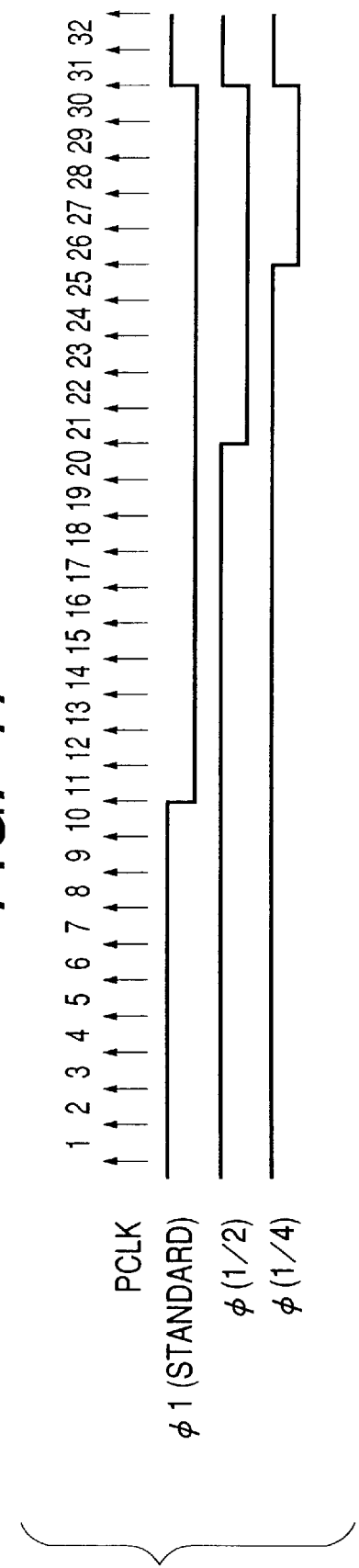
FIG. 17 is a timing chart showing the function of the light emission control unit.

The light emission timing control unit generates a signal Φ1, and the LED emits light when the signal Φ1 is at the L level state. A register 1601 sets the timing of leading edge of the signal Φ1, and sets a value common for all the process speeds. In the present example, a value "30(D)" is set in the register 1601. Registers 1602 to 1604 are used for setting the trailing end of the signal Φ1, and are respectively given the values for the standard speed, ½ speed and ¼ speed. More specifically, these values are assumed to be "10(D)", "20 (D)" and "25(D)". A selector 1605 selects the values of the registers 1602 to 1605 according to the output of the speed setting register 529. A 5-bit counter 1606 counts the system clock signal PCLK which is also the image clock signal. A comparator 1607 compares the value of the register 1601 with the output of the counter 1606, and releases an H-level output when they are mutually equal. The output of the comparator 1607 is supplied to the J port of a JK flip-flop 1609 to determine the timing of leading edge of the signal Φ1. A comparator 1608 compares the output of the counter 1606 with that of the selector 1605, and releases an H-level output when they are mutually equal. The output of the comparator 1608 is supplied to the K port of a JK flip-flop 1609 to determine the timing of trailing edge of the signal Φ1. FIG. 17 shows the timing of the signal Φ1 thus generated. As shown in FIG. 17, the light emission time for the standard speed, ½ speed or ¼ speed is respectively equal to 20, 10 or 5 counts of the PCLK signal. It is rendered possible to always maintain a constant image density by varying the light emission duty ratio of the LED according to the process speed.

The above-described control enables the smoothing process matching the process speed. It is thus made possible to execute the smoothing process in a more effective manner in the image formation at a speed lower than the standard speed. In the foregoing description there has been explained a case of employing three different process speeds, but the present invention is naturally not limited to such three process speeds and is not limited to a speed of ½" such as the ¼ speed.

As explained in the foregoing, the second embodiment, executing the smoothing process according to the process speed, allows to realize more effective smoothing in case of image formation at a speed lower than the standard speed.

Third Embodiment

The increase in the image density resulting from a decrease in the process speed is resolved in the first embodiment by varying the light emission duty ratio of the LED, but such drawback is resolved in the present embodiment by selectively inhibiting the recording of the image data by the unit of a line.

In the following there will be explained a method of masking the image data in order to inhibit the image data recording. The configuration of the digital color copying apparatus of the present embodiment is substantially same as that explained in FIGS. 1 to 3.

At first there will be explained the circuit configuration.

Figure 18:
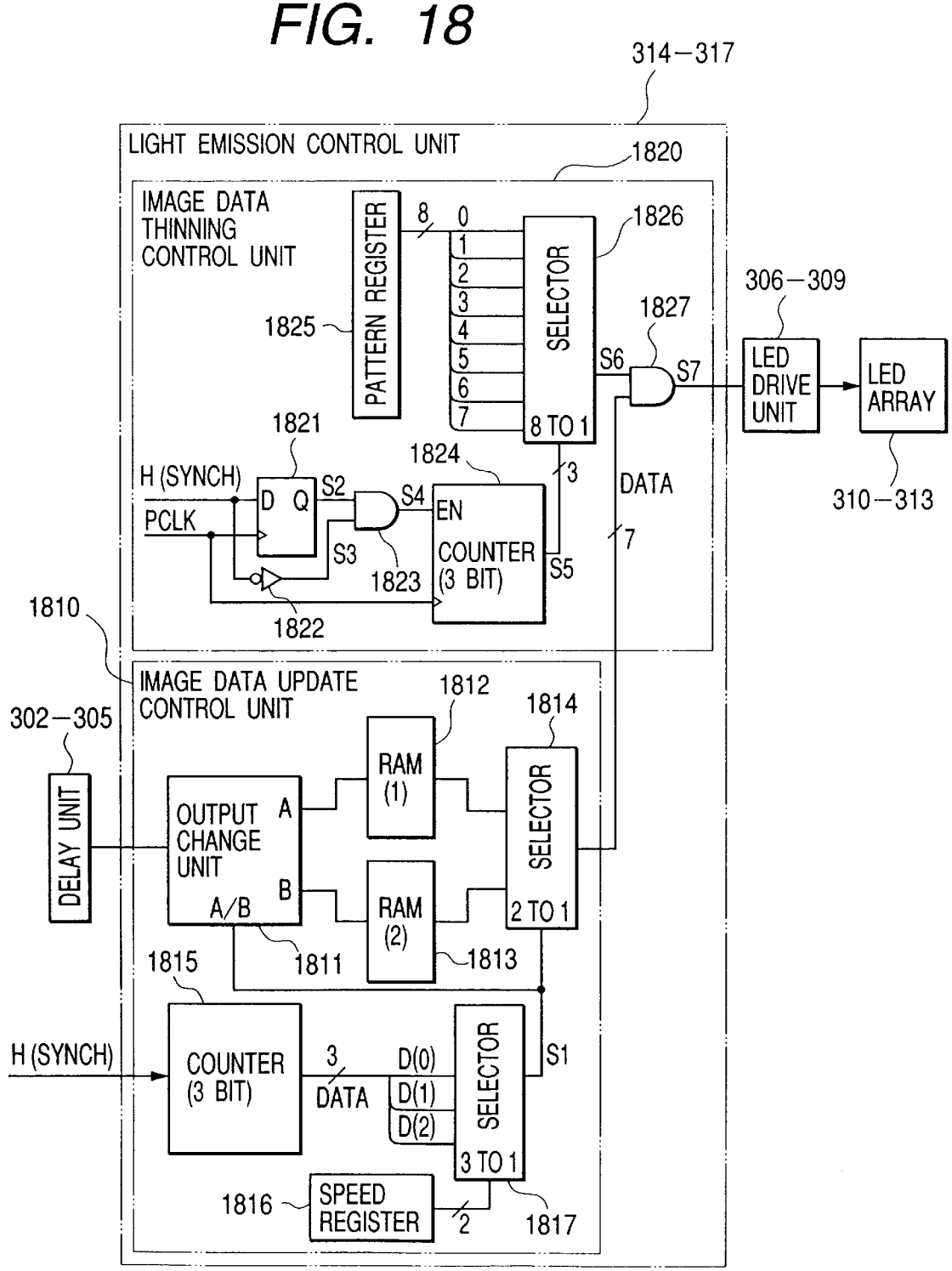
FIG. 18 is a block diagram of a light emission control unit in a third embodiment of the present invention.

FIG. 18 shows the internal configuration of the light emission control units 314 to 317 shown in FIG. 3. In the third embodiment, the light emission control unit 314 to 317 is composed of an image data update control unit 1810 and an image data masking control unit 1020.

The configuration of the image data update control unit 1810 will be explained with reference to FIG. 18.

The image data update control unit 1810 controls the data updating for every line. At first the output data from the delay units 302 to 305 are supplied to an output switching unit 1811, of which output is alternately into a RAM(1) 1812 and a RAM(2) 1813. The RAM's 1812, 1813 are line memories, in which written are data obtained by rearranging the raster data serially supplied from the delay units 302 to 305 in the order of light emission of the LED's by a data rearranging unit (not shown). The outputs of the RAM's 1812, 1813 are selected by a 2-to-1 selector 1814. The output switching unit 1811 and the selector 1814 are respectively switched by the output (update timing signal s1) of a selector 1817. The timing of data reading of the RAM's 1812, 1813 is not changed by the process speed.

The update timing signal s1, for switching the output switching unit 1811 and the selector 1814, is generated by a speed register 1816 and the selector 1817.

The speed register 1816 is composed of a 2-bit register, in which set is "00", "01" or "10" respectively for the standard speed, ½ speed or ¼ speed. The 3-to-1 selector 1817 receives a signal D outputted from a 3-bit counter 1815 for counting the main scanning synchronization signal H (having a period of 1 line of 600 dpi). The selector 1817 outputs data D(0), D(1) or D(2) respectively corresponding to the set value "00", "01" or "10" of the speed register 1816.

FIGS. 19A, 19B and 19C show an example of variation of the output of the selector 1817. FIG. 19A shows the output (first bit) of the data D(0) when "00" is set in the speed register 1816. FIG. 19B shows the output (second bit) of the data D(1) when "01" is set in the speed register 1816. FIG. 19C shows the output (third bit) of the data D(2) when "10" is set in the speed register 1816.

In FIG. 19A, the output changes in the unit of 1 bit, indicating that the update timing signal corresponds 1-to-1 to the main scanning synchronization signal H (standard speed).

In FIG. 19B, the output changes in the unit of 2 bits, indicating that the update timing signal corresponds 1-to-½ to the main scanning synchronization signal H (½ speed).

In FIG. 19C, the output changes in the unit of 4 bits, indicating that the update timing signal corresponds 1-to-¼ to the main scanning synchronization signal H (¼ speed).

The update timing signal s1 from the selector 1817 is also supplied to a page memory control unit (not shown) for controlling the timing of data reading from the page memory.

Such image data updating control allows to avoid the image compression in the sub scanning direction, even at the ½ or ¼ speed, in comparison with the image at the standard speed.

It is then necessary to resolve the change in the image density.

(Data Masking Control)

As already explained in the first embodiment with reference to FIGS. 7B and 7C, the image density increases to 2 or 4 times by adopting the ½ or ¼ speed even though the image size remains same. This drawback is resolved by the data masking control, executed by an image data masking control unit 1820.

Now the image data masking control unit 1820 will be explained with reference to FIGS. 18, 20 to 22.

The trailing end of the main scanning synchronization signal H is detected by a D-flip-flop 1821, an inverter 1822 and an AND gate 1823, and is entered into an enable port (EN) of a 3-bit counter 1824. 8192 cycle periods of the image transfer clock signal or system clock signal PCLK, having a frequency of 25 MHz, correspond to a cycle period of the main scanning synchronization signal.

The 3-bit counter 1824 counts the main scanning synchronization signal H, and sends an output signal to an 8-to-1 selector 1826 for selecting the output of a pattern register 1825 in the unit of a bit.

Figure 20:
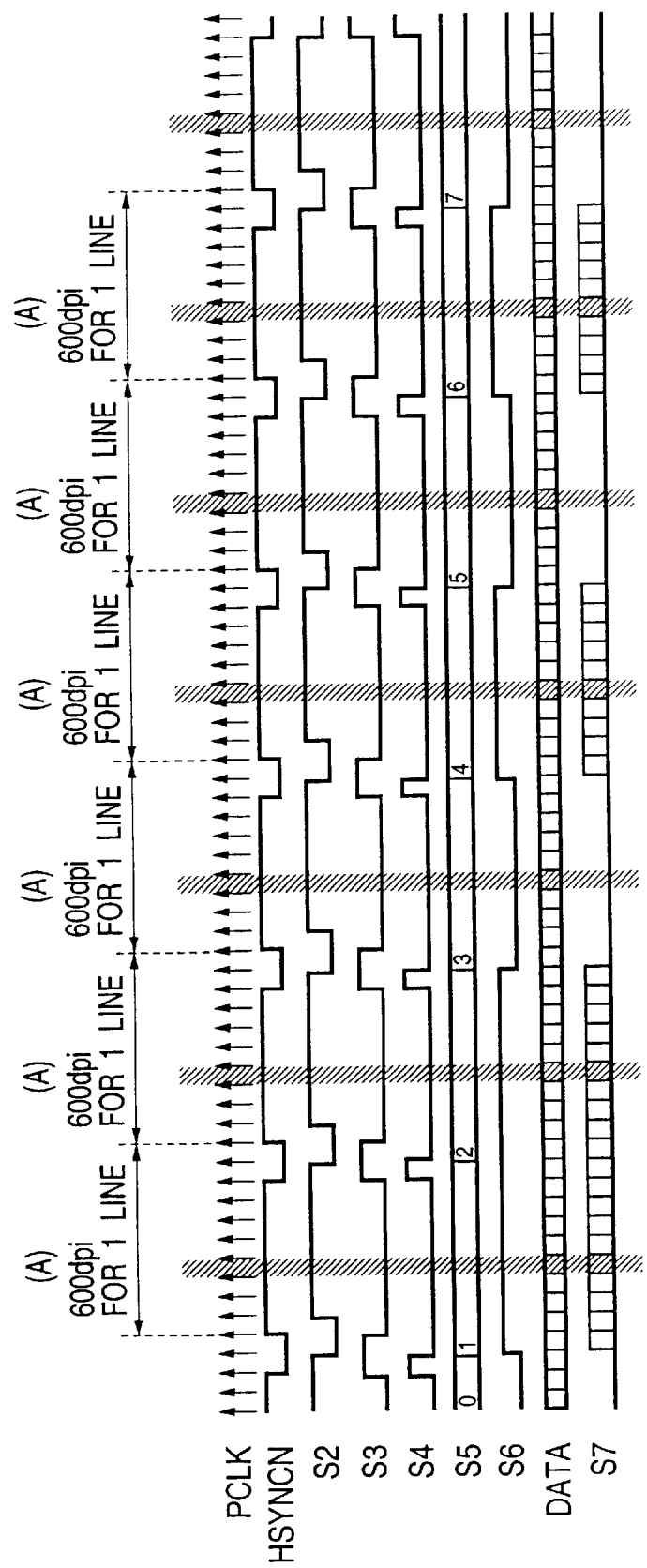
FIG. 20 is a timing chart showing the function of a data thinning control unit.

FIG. 20 shows the timing of various signals.

As will be understood from FIG. 20, the output signal S6 of the selector 1826 assumes the L-level state (=0) when the number of bits having a value "0" in the pattern register 1825 coincides with the output of the 3-bit counter 1824. As the output signal S6 and the output data DATA are entered into a combination circuit 1827, the output data DATA are masked by the output signal S6=L. Through such masking process, the output data DATA supplied to the combination circuit 1827 are masked in the unit of a line, whereby the output signal S7 therefrom constitutes data after such masking control.

FIG. 21 shows the correspondence between the set value in the pattern register and the output signal S5 to the selector 1826, applied to the recording with the ½ process speed. In the illustrated case, the set value of the register becomes "0" to execute the masking when the output signal S5 is "0", "3", "5" or "7".

FIG. 22 shows the output image under the conditions set in FIG. 21, wherein a broken line indicates a line not to be printed, and a solid line indicates a line to be printed. In contrast to the example shown in FIG. 7B where two lines are printed within a pixel width (area A) of 600 dpi, only one line is printed within the same pixel width in case of FIG. 22.

Such masking control in the line unit allows to bring the number of print lines per pixel width at the ½ process speed same as that in the standard speed, thereby obtaining a constant image density. Similarly the image density at the ¼ speed can be made same as that at the standard speed, by selecting values in the pattern register 1825 so as to execute light emission once in every four signals, such as "01000100".

It is also possible to obtain an image density of 2 or 4 times for a certain line, by varying the values set in the pattern register 1825. Also, instead of employing 8 bits in the pattern register 1825, it is possible to select a larger number of bits to set the printing pattern with a longer cycle period.

In the following there will be explained a variation of the above-described embodiment.

In the foregoing embodiment, the recording operation is inhibited by masking the image data, but it is also possible to mask the control signal for the recording operation, such as the LED light emission control signal.

As explained in the foregoing, the third embodiment selectively inhibits the recording of the image data in the unit of a line according to the process speed, thereby allowing to arbitrarily change the printing duty ratio in the sub scanning direction when the process speed is reduced for example to ½$^n$, thereby obtaining a constant density in the output image while maintaining a constant high voltage setting under a change in the process speed.

Also, since the masking pattern is made arbitrarily settable, the optimum output image can be obtained with an inexpensive configuration.

Fourth Embodiment

Figure 23B:
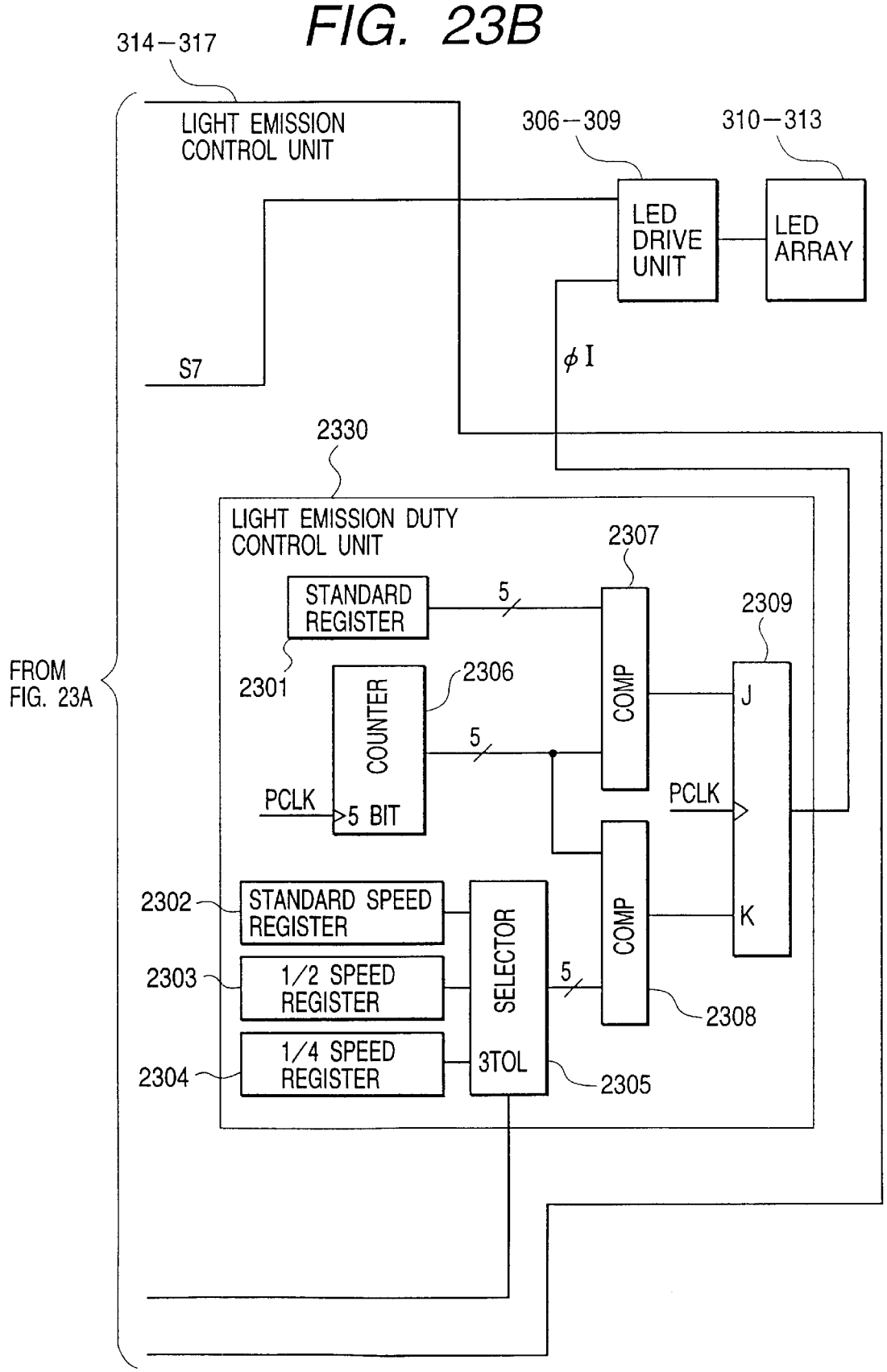
FIG. 23 which is comprised of FIGS. 23A and 23B is a block diagram of a light emission control unit in a fourth embodiment of the present invention.

For avoiding the change in the image density when the process speed is lowered, the first embodiment utilizes the light emission duty control unit while the third embodiment utilizes the image data masking control unit. In the following there will be explained a fourth embodiment in which the light emission control unit is provided with both the light emission duty control unit and the image data masking control unit as shown in FIGS. 23A and 23B. In the present embodiment, the configuration of the digital color copying apparatus is similar to that shown in FIGS. 1 to 3.

In order to avoid the image compression resulting from the decrease in the process speed, an image data update control unit 2310 shown in FIGS. 23A and 23B control the data updating for every line. The data from the delay units 303 to 305 shown in FIG. 3 are supplied to an output switching unit 2311, which effects switching operation by the output (update timing signal) from a selector 2317, of which output is alternately written into a RAM(1) 2312 and a RAM(2) 2313. The RAM's 2312, 2313 are line memories, in which written are data obtained by rearranging the raster data serially supplied from the delay units 302 to 305 in the order of light emission of the LED's by a data rearranging unit (not shown). The outputs of the RAM's 2312, 2313 are selected by a selector 2314. The timing of switching of the output switching unit 2311 and the selector 2314 is generated by a speed register 2340 and a selector 2317. The speed register is composed of a 2-bit register, in which set is "00", "01" or "10" respectively for the standard speed, ½ speed or ¼ speed. The selector 2317 receives a signal D outputted from a 3-bit counter 2315 for counting the main scanning synchronization signal HSYNCN (having a period of 1 scan of the head). The selector 2317 outputs data D(0), D(1) or D(2) respectively corresponding to the set value "00", "01" or "10" of the speed register. The output is also supplied to a page memory control unit (not shown), for also controlling the timing of data reading from the page memory. The reading control for the RAM's 2313, 2314 is executed alternately for every line as in the writing control therefor. Such configuration eliminates data updating at every main scanning sync signal at the ½ or ¼ speed, thereby providing an image as shown in FIGS. 7A to 7C without compression in the sub scanning direction resulting from the decrease in the process speed. The data updating is conducted by the image data update control unit in the manner shown in FIGS. 6A to 6E.

It is then necessary to resolve the change in the image density. As already explained in the first embodiment with reference to FIGS. 7B and 7C, the image density increases to 2 or 4 times by adopting the ½ or ¼ speed even though the image size remains same. In order to resolve this drawback, the fourth embodiment is provided with an image data masking control unit 2320 and a light emission duty control unit 2330.

At first there will be explained the image data masking control unit 2320. The trailing end of the main scanning synchronization signal HSYNCN is detected by a D-flip-flop 2321, an inverter 2322 and an AND gate 2323, and is entered into an enable port of a 3-bit counter 2324. 8192 cycle periods of the image transfer clock signal or system clock signal PCLK, having a frequency of 25 MHz, correspond to a cycle period of the main scanning synchronization signal HSYNCN. Thus the 3-bit counter 2324 counts the main scanning synchronization signal HSYNCN, and sends an output signal to a selector 2326 for selecting the output of a pattern register 2325 in every bit. The timings of various signals are shown in FIG. 20. Also the values set in the pattern register 2325 are shown in FIG. 21. As will be understood from these drawings, the output signal E of the selector 2326 assumes the L-level state when the number of bits having a value "0" in the pattern register 2325 coincides with the output of the 3-bit counter 2324, thereby masking the data by a combination circuit 2327. In this manner the data masking can be achieved.

FIG. 22 shows the output image obtained by the recording with the pattern register values (A) in FIG. 20 and with the ½ process speed, wherein a broken line indicates a line not to be printed and a solid line indicates a line to be printed. There is printed only one line within the pixel width at 600 dpi. Therefore the line pitch becomes same as in the standard speed. Also at the ¼ speed, there can be adopted such a register setting as to execute light emission once in every four signals, such as "01000100". It is also possible to obtain an image density of 2 or 4 times for a certain line, by varying the values set in the pattern register. Also, instead of employing 8 bits in the pattern register, it is possible to select a larger number of bits to set the printing pattern with a longer cycle period.

In the following there will be explained the light emission timing control unit 2330, which generates a signal Φ1. The LED emits light when the signal Φ1 is at the L level state. A reference register 2301 sets the timing of leading edge of the signal Φ1, common for all the process speeds. In the present example, a value "30(D)" is set in the register 2301. A standard speed register 2302, a ½ speed register 2303 and a ¼ speed register 2304 are used for setting the trailing end of the signal Φ1, and are respectively given the values for the standard speed, ½ speed and ¼ speed. For the purpose of simplicity, these values are assumed to be "10(D)", "20(D)" and "25(D)". A selector 2305 selects the values of the registers 2302 to 2305 according to the output of the speed setting register 2340. A 5-bit counter 2306 counts the system clock signal PCLK which is also the image transfer clock signal. A comparator 2307 compares the value of the register 2301 with, the output of the counter 2306, and releases an H-level output when they are mutually equal. The output of the comparator 2307 is supplied to the J port of a JK flip-flop 2309 to determine the timing of leading edge of the signal Φ1. A comparator 2308 compares the output of the counter 2306 with that of the selector 2305, and releases an H-level output when they are mutually equal. The output of the comparator 2308 is supplied to the K port of the JK flip-flop 2309 to determine the timing of trailing edge of the signal Φ1. The timing of the signal Φ1 thus generated is shown in FIGS. 8A to 8D. As shown in these drawings, the light emission time for the standard speed, ½ speed or ¼ speed is respectively equal to 20, 10 or 5 counts of the PCLK signal. FIGS. 9A to 9C schematically show the results of printing obtained with such timings. As will be apparent from FIGS. 9A to 9C, the image data update control and the light emission duty control allow to maintain a constant image density even under a variation in the process speed, thus obtaining images in a stable manner.

In the present embodiment, the light emission duty ratio is taken as 100% for the standard speed, 50% for the ⅓ speed and 25% for the ¼ speed for the purpose of simplicity, but the duty ratio do not assume such simple values in practice because it is combined with the data masking. It is desirable to determine the approximate density by the data masking control and to effect fine adjustment by the light emission duty control. The light emission duty ratio may be varied not only according to the process speed but also by the kind of the recording medium, in order to obtain the output image of even higher quality.

In the foregoing description there has been explained a case of employing three different process speeds, but the present invention is naturally not limited to such three process speeds and is not limited to a speed of ½ⁿ such as the ½ or ¼ speed.

Also in the fourth embodiment, the line masking control is achieved by masking the image data, it is also possible to mask the LED light emission control signal.

In the foregoing there has been explained a case of employing three different process speeds, but the present invention is not limited by the number of the process speeds. Also it is naturally not limited a speed of ½ⁿ such as the ½ or ¼ speed.

Furthermore, the present invention is not limited to a digital color copying apparatus but is applicable to various image forming apparatus.

Furthermore, the present invention is not limited to a printer having an array of light emitting elements such as LED's, but is also applicable to an ink jet printer having an ink jet head.

The present invention may also be applied to a system consisting of plural equipment (for example host computer, interface devices, reader, printer etc.) or an apparatus consisting of a single equipment (such as a copying machine or a facsimile apparatus).

Also the present invention is naturally applicable to a case where the present invention is attained by supplying the system or the apparatus with a program. The effects of the present invention can be enjoyed supplying the system or the apparatus with a recording medium storing a program represented by a software for realizing the present invention and reading executing the program codes stored in the memory medium by a computer (CPU or MPU) of the above-mentioned system or apparatus.

In such case the program codes read from the memory medium realize the functions of the aforementioned embodiments, and the memory medium storing the program codes constitutes the present invention.

The memory medium storing such program codes can be, for example, a floppy disk, a hard disk, an optical disk, a magnetooptical disk, a CD-ROM, a CR-R, a magnetic tape, a non-volatile memory card or a ROM (masked ROM, flash EEPROM etc.).

The present invention also includes not only a case where the functions of the aforementioned embodiments are realized by the execution of the read program codes by the computer but also a case where an operating system or the like functioning on the computer executes all or a part of the actual processes under the control of such program codes thereby realizing the functions of the foregoing embodiments.

The present invention further includes a case wherein the program codes read from the memory medium are once stored in a function expansion board inserted into the computer or a function expansion unit connected to the computer, and a CPU provided in the function expansion board or the function expansion unit executes all the process or a part thereof according to the instructions of such program codes, thereby realizing the functions of the aforementioned embodiments.

The present invention has been explained by certain preferred embodiments thereof, but the present invention is by no means limited by such embodiments and is subject to various modifications and applications within the scope and spirit of the appended claims.

What is claimed is:

1. An image forming apparatus comprising:
    a recording element array including plural recording elements arranged in an array;
    image forming means for causing a relative movement between said recording element array and a recording medium to form an image thereon;
    drive means for driving said recording element array based on image data;
    duty control means for varying the recording duty of said recording elements according to the relative movement speed between said recording element array and the recording medium; and
    memory means for storing image data;
    readout means for reading the image data from said memory means,
    wherein said drive means is adapted to drive said recording element array based on the image data read from said memory means;
    update means for updating the image data stored in said memory means; and update control means for varying the timing of updating of said update means according to the relative speed of said image forming means.

2. An image forming apparatus according to claim 1, wherein said recording elements are light emitting elements.

3. An image forming apparatus comprising:

a recording element array including plural recording elements arranged in an array;

image forming means for causing a relative movement between said recording element array and a recording medium to form an image thereon;

memory means for storing image data;

drive means for driving said recording element array based on the image data read from said memory means;

inhibition means for selectively inhibiting the recording operation by the image data read from said memory means, according to the relative movement speed between said recording element array and the recording medium; and update means for updating image data stored in said memory means; and update control means for varying the timing of updating of said update means according to said relative speed.

4. An image forming apparatus according to claim 3, wherein said inhibition means includes masking means for selectively masking the image data.

5. An image forming apparatus according to claim 3, wherein said inhibition means is adapted to selectively inhibit the recording by operating a recording operation control signal for said recording element array.

6. An image forming apparatus according to claim 3, wherein said inhibition means is adapted to selectively inhibit the recording by the image data in the unit of a line of the image.

7. An image forming apparatus according to claim 3, wherein said inhibition means is adapted to execute inhibition according to the result of comparison of a register value and a counter value.

8. An image forming apparatus according to claim 7, further comprising:

plural registers storing values corresponding to plural relative speeds; and a selector for selecting any of said plural registers according to said relative speed.

9. An image forming apparatus according to claim 3, further comprising:

duty control means for varying a recording duty of said recording element according to said relative speed.

10. An image forming apparatus according to claim 3, wherein said recording elements are light emitting elements.

11. An image forming apparatus comprising:

a recording element array including plural recording elements arranged in an array;

image forming means for causing a relative movement between said recording element array and a recording medium to form an image thereon;

smoothing means for applying a smoothing process in the image data, according to the relative movement speed between said recording element array and the recording medium;

drive means for driving said recording element array, based on the image data subjected to the smoothing process by said smoothing means; and update means for updating image data stored in said memory means; and update control means for varying the update timing of said update means according to said relative speed.

12. An image forming apparatus according to claim 11, further comprising:

memory means for storing image data of plural lines; and plural reference tables adapted to effect conversion of an object pixel and corresponding to said relative movement speed of plural kinds, wherein said smoothing means is adapted to compare the content stored in said memory means and said reference table.

13. An image forming apparatus according to claim 11, further comprising:

duty control means for varying a recording duty of said recording elements according to said relative movement speed.

14. An image forming apparatus according to claim 12, wherein said recording elements are light emitting elements.

15. A recording control device for an image forming apparatus for forming an image on a recording medium, the device comprising:

a recording element array including plural recording elements arranged in an array;

drive means for driving said recording element array based on image data;

duty control means for varying the recording duty of said recording elements according to the relative movement speed between said recording element array and the recording medium;

memory means for storing the image data;

read-out means for reading the image data from said memory means, wherein said drive means is adapted to drive said recording element array based on the image data read from said memory means;

update means for updating the image data stored in said memory means; and update control means for varying the update timing of said update means according to the relative speed of said image forming means.

16. A recording control device according to claim 15, wherein said recording elements are light emitting elements.

17. A recording control device for an image forming apparatus for forming an image on a recording medium, the device comprising:

a recording element array including plural recording elements arranged in an array;

memory means for storing image data;

drive means for driving said recording element array based on the image data read from said memory means; and inhibition means for selectively inhibiting the recording operation by the image data read from said memory means, according to the relative movement speed between said recording element array and the recording medium; and update means for updating the image data stored in said memory means; and update control means for varying the update timing of said update means according to said relative speed.

18. A recording control device according to claim 17, wherein said inhibition means includes masking means for selectively masking the image data.

19. A recording control device according to claim 17, wherein said inhibition means is adapted to selectively inhibit recording by operating a recording operation control signal for said recording element array.

20. A recording control device according to claim 17, wherein said inhibition means is adapted to selective inhibit the recording by the image data in the unit of a line of the image.

21. A recording control device according to claim 17, wherein said inhibition means is adapted to effect inhibition according to the result of comparison of a register value and a counter value.

22. A recording control device according to claim 21, further comprising:
  plural registers storing values corresponding to plural relative speeds; and
  a selector for selecting any of said plural registers according to said relative speed.

23. A recording control device according to claim 17, further comprising:
  duty control means for varying a recording duty of said recording elements according to said relative speed.

24. A recording control device according to claim 17, wherein said recording elements are light emitting elements.

25. A recording control device for an image forming apparatus for forming an image on a recording medium, the device comprising:
  a recording element array including plural recording elements arranged in an array;
  smoothing means for applying a smoothing process to image data according to the relative movement speed between said recording element array and the recording medium; and
  drive means for driving said recording element array based on the image data subjected to the smoothing process by said smoothing means;
  update means for updating the image data stored in said memory means; and
  update control means for varying the update timing of said update means according to said relative speed.

26. A recording control device according to claim 25, further comprising:
  memory means for storing image data of plural lines; and
  plural reference tables adapted to convert an object pixel and corresponding to said relative movement speed of plural kinds,
  wherein said smoothing means is adapted to compare the content stored in said memory means with said reference table.

27. A recording control device according to claim 25, further comprising:
  duty control means for varying the recording duty of said recording elements according to said relative movement speed.

28. A recording control device according to claim 25, wherein said recording elements are light emitting elements.

29. An image forming apparatus comprising:
  a recording element array including plural recording elements arranged in an array;
  image forming means for causing a relative movement between said recording element array and a recording medium to form an image thereon;
  memory means for storing image data;
  drive means for driving said recording element array based on the image data read from said memory means;
  inhibition means for selectively inhibiting the recording operation by the image data read from said memory means, according to the relative movement speed between said recording element array and the recording medium,
  wherein said inhibition means includes masking means for selectively masking the image data.

30. An image forming apparatus comprising:
  a recording element array including plural recording elements arranged in an array;
  image forming means for causing a relative movement between said recording element array and a recording medium to form an image thereon;
  memory means for storing image data;
  drive means for driving said recording element array based on the image data read from said memory means;
  inhibition means for selectively inhibiting the recording operation by the image data read from said memory means, according to the relative movement speed between said recording element array and the recording medium,
  wherein said inhibition means is adapted to execute inhibition according to the result of comparison of a register value and a counter value.

31. An image forming apparatus comprising:
  a recording element array including plural recording elements arranged in an array;
  image forming means for causing a relative movement between said recording element array and a recording medium to form an image thereon;
  smoothing means for applying a smoothing process in the image data, according to the relative movement speed between said recording element array and the recording medium;
  drive means for driving said recording element array, based on the image data subjected to the smoothing process by said smoothing means;
  memory means for storing image data of plural lines; and
  plural reference tables adapted to effect conversion of an object pixel and corresponding to said relative movement speed of plural kinds,
  wherein said smoothing means is adapted to compare the content stored in said memory means and said reference table.

32. An image forming apparatus according to claim 31, wherein said recording elements are light emitting elements.

33. A recording control device for an image forming apparatus for forming an image on a recording medium, the device comprising:
  a recording element array including plural recording elements arranged in an array;
  memory means for storing image data;
  drive means for driving said recording element array based on the image data read from said memory means; and
  inhibition means for selectively inhibiting the recording operation by the image data read from said memory means, according to the relative movement speed between said recording element array and the recording medium,
  wherein said inhibition means includes masking means for selectively masking the image data.

34. A recording control device for an image forming apparatus for forming an image on a recording medium, the device comprising:

a recording element array including plural recording elements arranged in an array;

memory means for storing image data;

drive means for driving said recording element array based on the image data read from said memory means; and inhibition means for selectively inhibiting the recording operation by the image data read from said memory means, according to the relative movement speed between said recording element array and the recording medium, wherein said inhibition means is adapted to effect inhibition according to the result of comparison of a register value and a counter value.

35. A recording control device according to claim 34, further comprising:

plural registers storing values corresponding to plural relative speeds; and a selector for selecting any of said plural registers according to said relative speed.

36. A recording control device for an image forming apparatus for forming an image on a recording medium, the device comprising:

a recording element array including plural recording elements arranged in an array;

smoothing means for applying a smoothing process to image data according to the relative movement speed between said recording element array and the recording medium;

drive means for driving said recording element array based on the image data subjected to the smoothing process by said smoothing means;

memory means for storing image data of plural lines; and plural reference tables adapted to convert an object pixel and corresponding to said relative movement speed of plural kinds, wherein said smoothing means is adapted to compare the content stored in said memory means with said reference table.

* * * * *